(12) United States Patent
Brereton et al.

(10) Patent No.: US 11,673,616 B2
(45) Date of Patent: Jun. 13, 2023

(54) DEVICES, SYSTEMS, AND METHODS FOR MOVING VEHICLES

(71) Applicant: InRange Technologies, LLC, Raleigh, NC (US)

(72) Inventors: Timothy Brereton, Rolesville, NC (US); Christopher Will, Andover, MN (US); Brett Simmons, Minneapolis, MN (US)

(73) Assignee: InRange Technologies, LLC, Raleigh, NC (US)

( * ) Notice: Subject to any disclaimer, the term of this patent is extended or adjusted under 35 U.S.C. 154(b) by 186 days.

(21) Appl. No.: 17/193,577

(22) Filed: Mar. 5, 2021

(65) Prior Publication Data

US 2021/0276634 A1 Sep. 9, 2021

Related U.S. Application Data

(60) Provisional application No. 63/080,225, filed on Sep. 18, 2020, provisional application No. 63/018,683, filed on May 1, 2020, provisional application No. 62/986,259, filed on Mar. 6, 2020.

(51) Int. Cl.
  *B62D 35/00* (2006.01)
  *B60R 13/00* (2006.01)
  *G01S 19/42* (2010.01)

(52) U.S. Cl.
  CPC ............ *B62D 35/001* (2013.01); *B60R 13/00* (2013.01); *G01S 19/42* (2013.01)

(58) Field of Classification Search
  CPC ....... B62D 35/001; B60R 13/00; G01S 19/14; G01S 19/35; G01S 19/42; G09F 21/048
  See application file for complete search history.

(56) References Cited

U.S. PATENT DOCUMENTS

| 4,611,847 A | 9/1986 | Sullivan |
| 6,932,419 B1 | 8/2005 | McCullough |
| 7,449,998 B1 * | 11/2008 | Au .......................... B60Q 1/50 455/99 |
| 8,303,025 B2 | 11/2012 | Senatro |
| 8,408,570 B2 | 4/2013 | Heppel et al. |

(Continued)

OTHER PUBLICATIONS

Eagles et al., "A Parametric Assessment of Skirt Performance on a Single Bogie Commercial Vehicle," SAE International Journal of Commercial Vehicles, 2013, vol. 6, No. 2, pp. 459-476.

(Continued)

*Primary Examiner* — Lori L Lyjak
(74) *Attorney, Agent, or Firm* — Michael Best & Friedrich LLP

(57) ABSTRACT

A vehicle system includes a vehicle, a server configured to store position information, and a skirt coupled to the vehicle. The skirt includes a graphical representation. A global positioning system (GPS) tracking device is coupled to the vehicle and is associated with the graphical representation. The GPS tracking device wirelessly is coupled to the server and includes an electronic processor and a memory. The electronic processor is configured to receive, via a GPS interface, a position of the graphical representation, and transmit, via a transceiver, the position of the graphical representation to the server. The position of the graphical representation is accessible via an application on a mobile device.

24 Claims, 23 Drawing Sheets

(56) References Cited

U.S. PATENT DOCUMENTS

| | | | |
|---|---|---|---|
| 8,727,425 B1 | 5/2014 | Senatro | |
| 9,308,949 B1* | 4/2016 | Mihelic | B62D 35/001 |
| 10,093,363 B2 | 10/2018 | Brereton et al. | |
| 10,829,168 B2 | 11/2020 | Senatro | |
| 2003/0057736 A1 | 3/2003 | Long | |
| 2012/0074728 A1* | 3/2012 | Senatro | B62D 35/001 |
| | | | 296/180.4 |
| 2017/0274942 A1* | 9/2017 | Boivin | B62D 35/001 |
| 2018/0050742 A1 | 2/2018 | Smith et al. | |
| 2018/0118143 A1* | 5/2018 | Ponder | B62D 35/001 |
| 2018/0304941 A1* | 10/2018 | Ehrlich | B60R 19/565 |
| 2019/0077470 A1* | 3/2019 | Kunkel | B62D 21/20 |
| 2019/0256026 A1* | 8/2019 | Kunkel | B60R 19/565 |
| 2019/0337576 A1 | 11/2019 | Brereton et al. | |
| 2020/0231226 A1 | 7/2020 | Senatro et al. | |

OTHER PUBLICATIONS

Canadian Patent Office Action for application 3,111,315, dated Jun. 1, 2022 (4 pages).

* cited by examiner

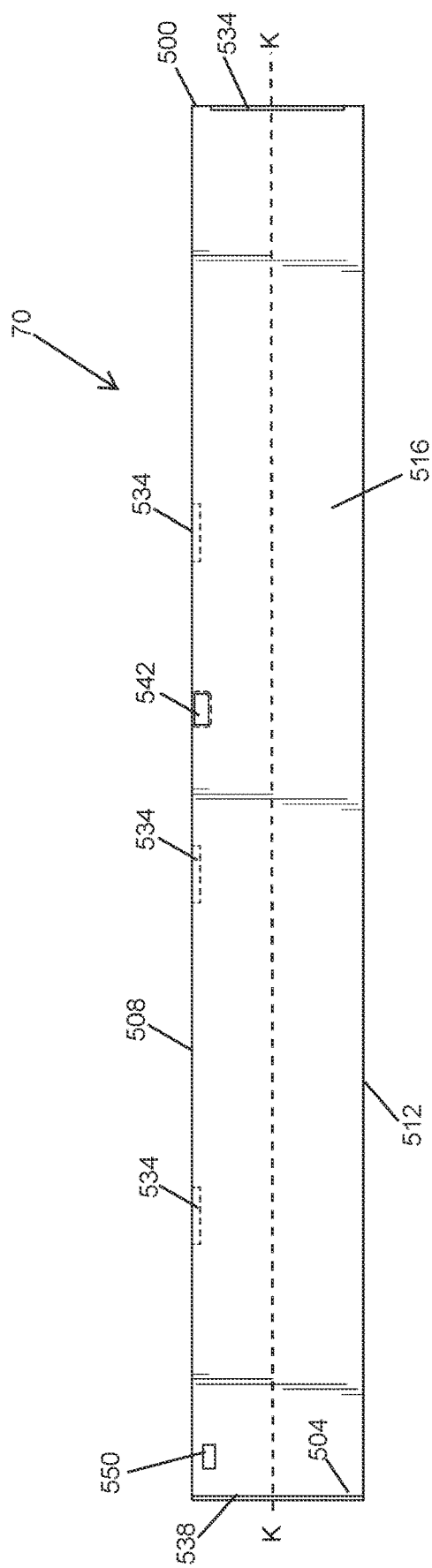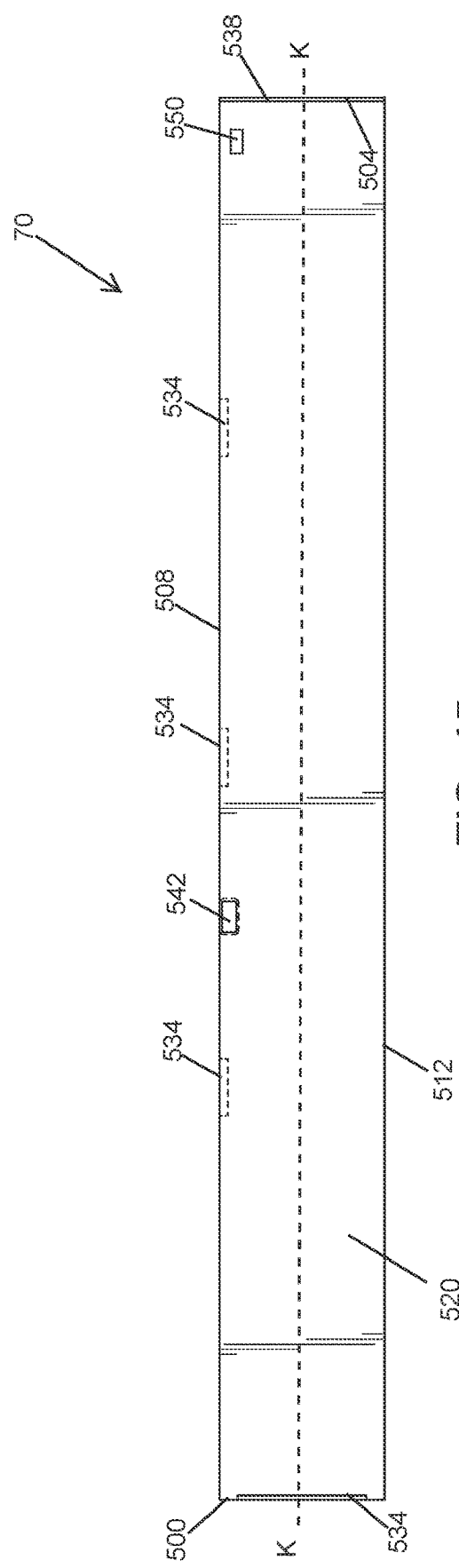

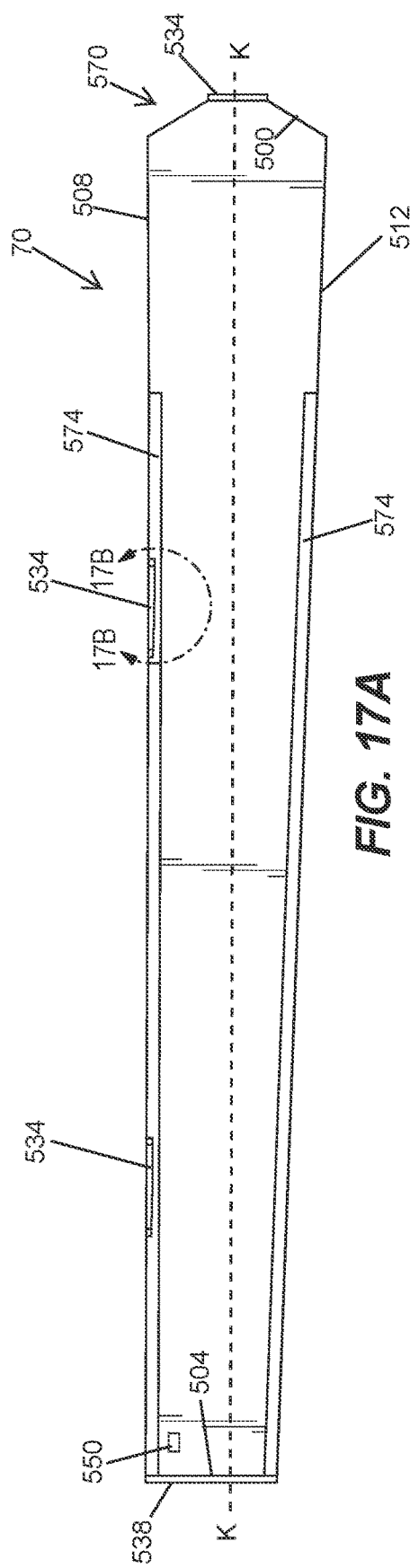
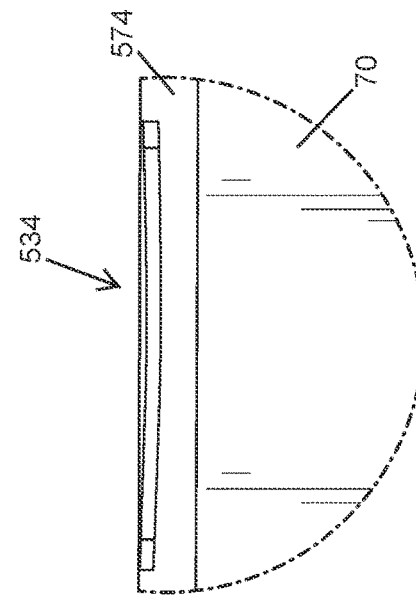
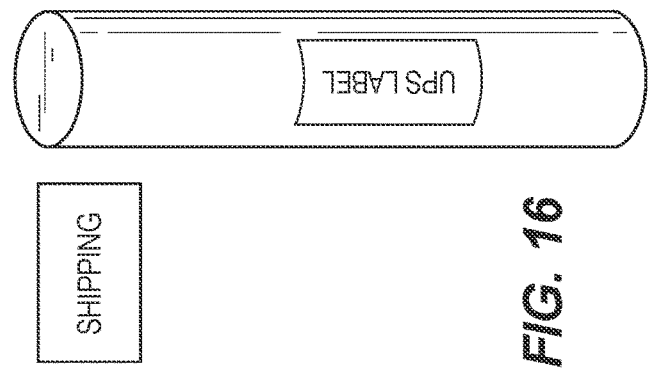
FIG. 17A
FIG. 17B
FIG. 16

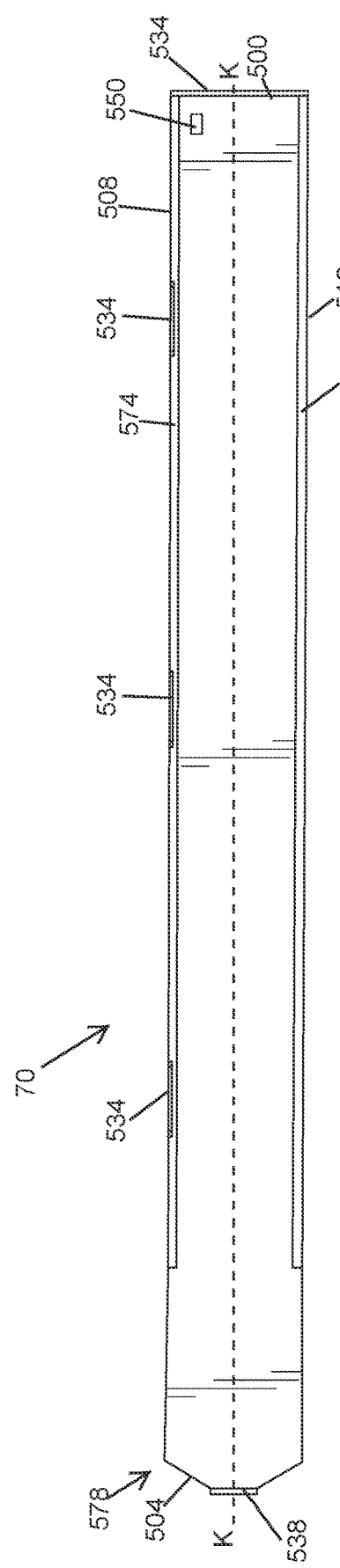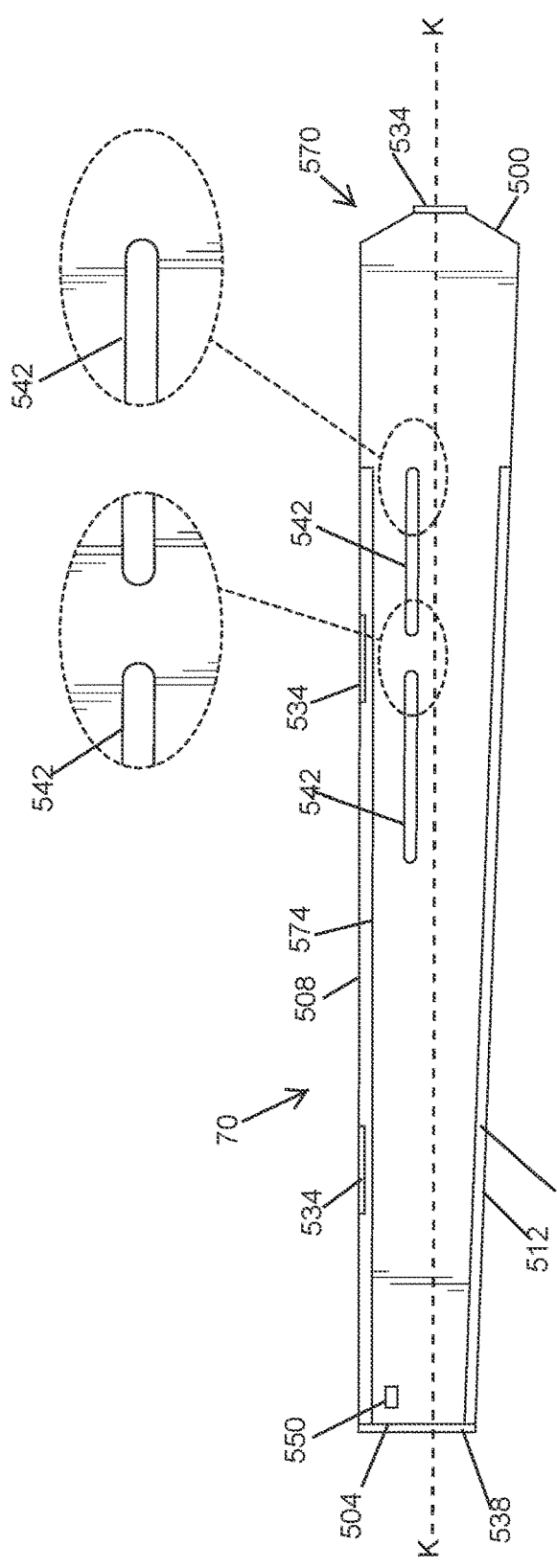
FIG. 18
FIG. 19

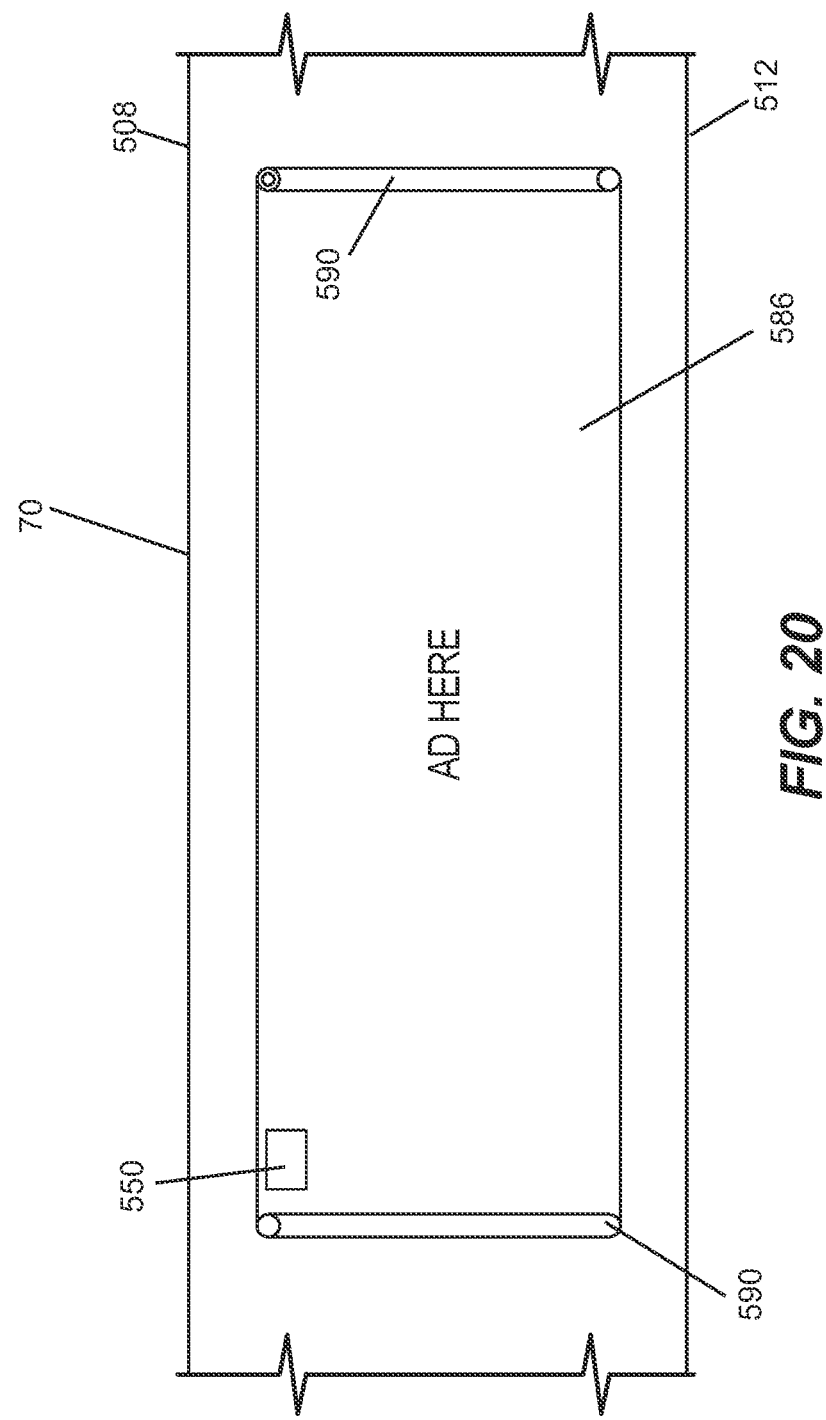

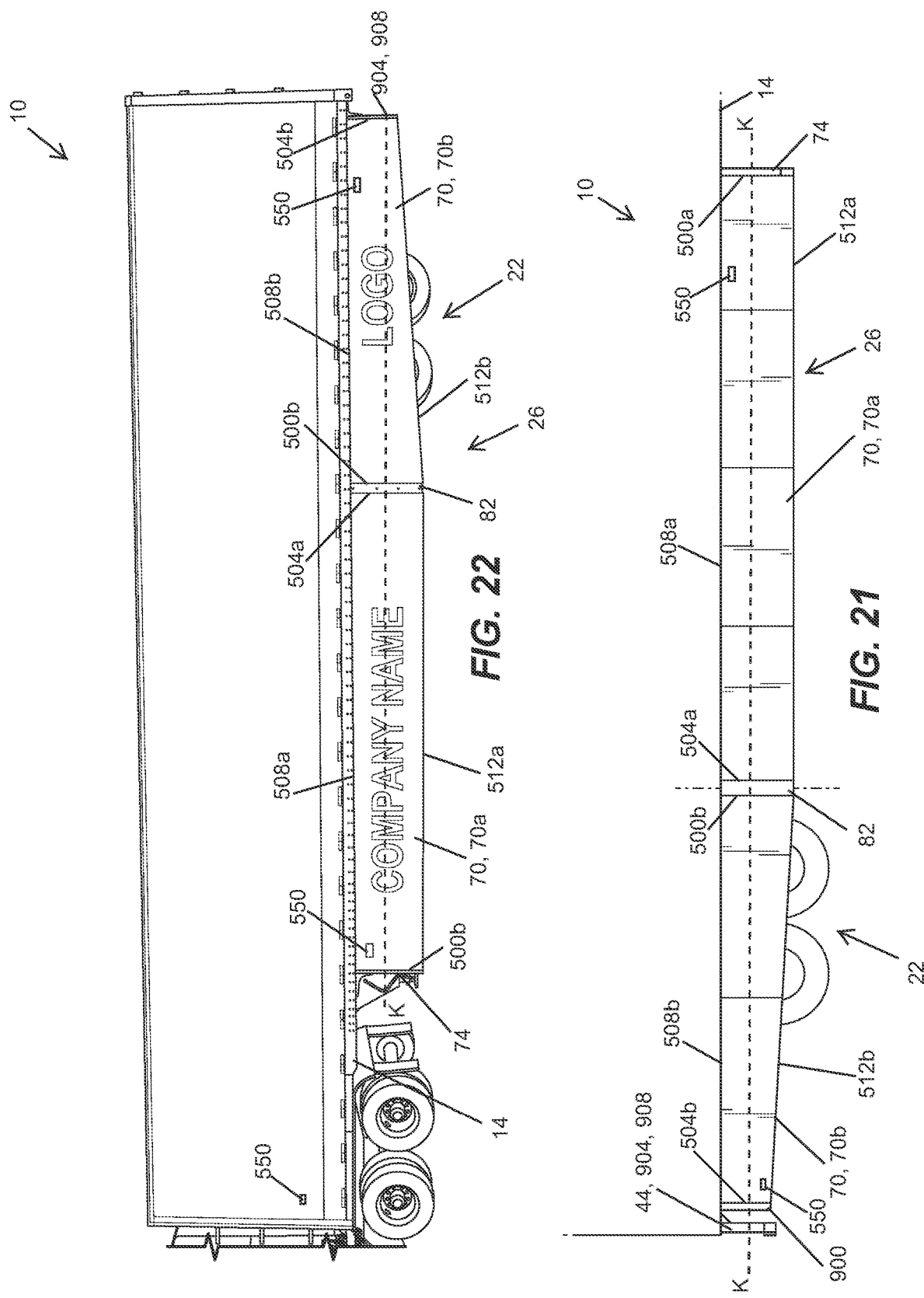

DEVICES, SYSTEMS, AND METHODS FOR MOVING VEHICLES

CROSS-REFERENCE TO RELATED APPLICATIONS

This application claims the benefit of prior-filed U.S. Provisional Patent Application No. 62/986,259, filed Mar. 6, 2020, U.S. Provisional Patent Application No. 63/018,683, filed May 1, 2020, and U.S. Provisional Patent Application No. 63/080,225, filed Sep. 18, 2020, the entire contents of each are incorporated by reference.

FIELD

Various aspects of the present disclosure relate generally to devices, systems, and methods configured to improve fuel economy and/or aerodynamics in moving vehicles. More specifically, the present disclosure relates to devices, systems, and methods that utilize a pliable material or fabric positioned on a vehicle for improving fuel economy and/or aerodynamics of the vehicle. Furthermore, the present disclosure relates to devices, systems, and methods that relate to displaying graphical representations on aerodynamic devices. Additionally, the present disclosure relates to devices, systems, and methods that relate to protecting aerodynamic devices and/or the moving vehicles.

BACKGROUND

Skirts on trailers, trucks, and other vehicles or devices used with vehicles have been used for many years to reduce drag and/or suppress spray and splashing. These skirts extend downward from the trailer bottom edge towards the roadway.

Innovation in the design and manufacture of skirts has been minimal. Most changes have focused on the bracket to hold the skirt wall and ensuring that the bracket can absorb shocks in the case of the skirt wall being impacted during transit. The primary cause of this need for shock absorption has been a method of installation of a rigid skirt wall.

Existing skirt walls do not extend to the rear of the trailer, for example, past the rear tandem wheels. Several constraints make a longer skirt difficult to design. First, present designs focus on maximizing skirt height (vertical distance). As a result, the skirt wall and support brackets have been made of a resilient material in order to protect against impacts from other vehicles, curbs, loading docks, etc. These designs are not well suited to extend around the wheels where any bend in the skirt would damage or obstruct the wheels. Second, the resilient skirt systems include brackets that do not extend to the bottom of the skirt. This may be due to cost considerations (shorter brackets are cheaper) or primarily to ensure that, if the skirt is impacted, the bracket is not damaged. Longer brackets may help protect against the skirt wall engaging anything behind the skirt, such as wheels. However, longer brackets present design challenges in order for the bracket to fit around the rear tandem wheels. Third, the use of primarily rigid, but resilient, materials for the skirt wall has many drawbacks. While durable, the rigid materials tend to be heavy, difficult to repair, and too cumbersome to move.

The use of rigid materials for the skirt wall has many drawbacks. While durable, the rigid materials tend to be heavy and difficult to repair. Additionally, the rigidity forces the system or systems coupling the rigid skirt wall to the vehicle to become permanent installations. In particular, it is cumbersome to remove the skirt wall from a mounting system where the mounting system is designed to ensure that the rigid material making up the skirt panel is well secured. As a result, many skirt systems block access to the bottom of the vehicle or trailer. Although hinged or articulated arm systems have been developed to couple the skirt to a vehicle or trailer, existing skirts have a limited length in order to ensure that the skirts do not block access to important components of the vehicle or trailer, such as, for example, the rear tandem wheels and/or landing gear. Including one or more hinges to movably couple the skirt 70 to the vehicle or trailer often yields a cumbersome system that blocks access to the wheels and may be difficult to operate. A majority of semi-trailer activities require a pre-trip Department of Transportation mandated "walk-around" or visual inspection of the wheels, so a skirt that blocks or inhibits the view or access to the wheels would be detrimental. Moreover, existing skirt systems often block or inhibit access to spare tires and other elements positioned on the underside of the trailer, especially when rear tandems wheels are moved fully forward for carrying certain loads.

Eagles, N. and Cragun, M., "A Parametric Assessment of Skirt Performance on a Single Bogie Commercial Vehicle," SAE Int. J. Commer. Veh. 6(2):2013, doi:10.4271/2013-01-2415, have also shown that nearly any design of a skirt under the trailer will help to reduce wind drag, and accordingly reduce the amount of fuel, and, correspondingly, the cost necessary to pull the trailer. Over 2,000 different designs of trailer skirts were tested, but none of the designs include a trailer skirt that extends outside of the area between the truck landing gear and the rear tandem wheels of the trailer. Longer versions of trailer skirts have been used on Department of Energy "Super Trucks" and have confirmed that there may be benefits to a longer trailer skirt, but any such trailer skirts have been made of a rigid material.

As mentioned, the use of rigid material to form the skirt wall means that the skirt installation is substantially permanent, such that many owners or operators consider the skirts to be part of the trailer for its foreseeable life. The substantially permanent trailer skirt may significantly reduce the payback period of the truck-trailer system by the factor of the ratio of tractors to trailers for the particular freight company. For example, according to the North American Council for Freight Efficiency, the average freight transportation fleet has three trailers for every tractor. Since aerodynamic drag on a trailer can only be reduced when the trailer is being pulled by a tractor, the trailers currently not in use derive no benefit from an aerodynamic skirt device. Many calculated payback periods typically ignore this fact of the freight industry's operations.

The devices and methods of the current disclosure may rectify some of the deficiencies described above or address other aspects of the prior art.

SUMMARY

In one aspect, a vehicle system includes a vehicle, a server configured to store position information, and a skirt coupled to the vehicle. The skirt includes a graphical representation. A global positioning system (GPS) tracking device is coupled to the vehicle and is associated with the graphical representation. The GPS tracking device wirelessly is coupled to the server and includes an electronic processor and a memory. The electronic processor is configured to receive, via a GPS interface, a position of the graphical representation, and transmit, via a transceiver, the position of the graphical representation to the server. The position of the graphical representation is accessible via an application on a mobile device.

In another aspect, a skirt assembly for use with a vehicle configured to transport cargo is disclosed. The vehicle includes a frame, a first set of wheels, and a second set of wheels. The frame has a first end, a second end opposite the first end, a longitudinal axis extending from the first end to the second end, a first side, and a second side opposite the first side. The first set of wheels is positioned rearward of the first end and the second set of wheels is positioned forward of the second end. The skirt assembly includes a first mount secured to the frame between the first set of wheels and the second set of wheels, a second mount secured to the frame between the first mount and the second end of the frame, the second mount having a tensioning device, and a skirt formed from a pliable material and having a first end and a second end opposite the first end. The first skirt end is coupled to the first mount and the second skirt end is coupled to the tensioning device. Actuation of the tensioning device tightens the skirt in a direction toward the second end of the frame to a predetermined tension.

In another aspect, a skirt assembly for use with a vehicle configured to transport cargo is disclosed. The vehicle includes a frame, a first set of wheels, and a second set of wheels. The frame has a first end, a second end opposite the first end, a longitudinal axis extending from the first end to the second end, a first side, and a second side opposite the first side. The first set of wheels is positioned rearward of the first end and the second set of wheels is positioned forward of the second end. The skirt assembly includes a first mount secured to the frame between the first set of wheels and the second set of wheels, a second mount secured to the frame between the first mount and the second end of the frame, and a third mount secured to the frame between the second mount and the second end of the frame. The second mount has a first tensioning device and a second tensioning device. A first skirt portion is formed of a pliable material and has a first end and a second end opposite the first end. The first end of the first skirt portion is coupled to the first mount and the second end of the first skirt portion is coupled to the first tensioning device. A second skirt portion is formed of a pliable material and has a first end and a second end opposite the first end. The first end of the second skirt portion is coupled to the second tensioning device and the second end of the first skirt portion is coupled to the third mount. Actuation of the first tensioning device tightens the first skirt portion in a direction toward the second end of the frame to a first predetermined tension, and actuation of the second tensioning device tightens the first skirt portion in a direction toward the first end of the frame to a second predetermined tension.

Additionally, in some aspects, a trailer owner, operator, etc. may wish to display graphic representations (e.g., advertising for the owner, operator, etc.; advertising for another company, entity, etc.; contact information; or other graphical representation) on one or more portions of the trailer, for example, on a skirt. The trailer owner, operator, etc. may also desire to quickly and/or easily install, uninstall, and/or change the graphical representations displayed on the one or more portions of the trailer. Furthermore, in some aspects, a trailer owner, operator, etc. may desire to track the location (s) of one or more pieces of material that display the graphical representations, for example, via global positioning satellite ("GPS") tracking. In other aspects, a trailer owner, operator, etc. may seek to easily ship, return, swap, replace, etc. multiple pieces of material that display the graphical representations, which may also include replacing, recharging, or otherwise maintaining portions of the piece of material, tracking elements, etc. Moreover, in some aspects, it may be desirable to include one or more protective elements or assemblies to a trailer, for example, on one or more portions of one or more sides of the trailer, which may help to protect one or more aerodynamic devices (e.g., a skirt) that are coupled to the trailer.

BRIEF DESCRIPTION OF THE DRAWINGS

FIG. 14 illustrates a side view of a skirt according to one embodiment that is useable with the skirt assembly of FIGS. 1A and 1B.

FIG. 15 illustrates another side view of the skirt of FIG. 14.

FIG. 16 illustrates a container that the skirt of FIG. 14 may be positioned in for shipping.

FIG. 17A illustrates a side view of a skirt according to another embodiment that is usable with the skirt assembly of FIGS. 1A and 1B.

FIG. 17B is a detailed view of a portion of the skirt of FIG. 17A.

FIG. 18 illustrates a side view of a skirt according to another embodiment that is usable with the skirt assembly of FIGS. 1A and 1B.

FIG. 19 illustrates a side view of a skirt according to another embodiment that is usable with the skirt assembly of FIGS. 1A and 1B.

FIG. 20 illustrates a side view of a skirt according to another embodiment that is usable with the skirt assembly of FIGS. 1A and 1B.

FIG. 21 illustrates a perspective view of the vehicle of FIG. 1A including a skirt assembly according to another embodiment.

FIG. 22 illustrates a perspective view of the vehicle of FIG. 1A including a skirt assembly according to another embodiment.

Figure 1:
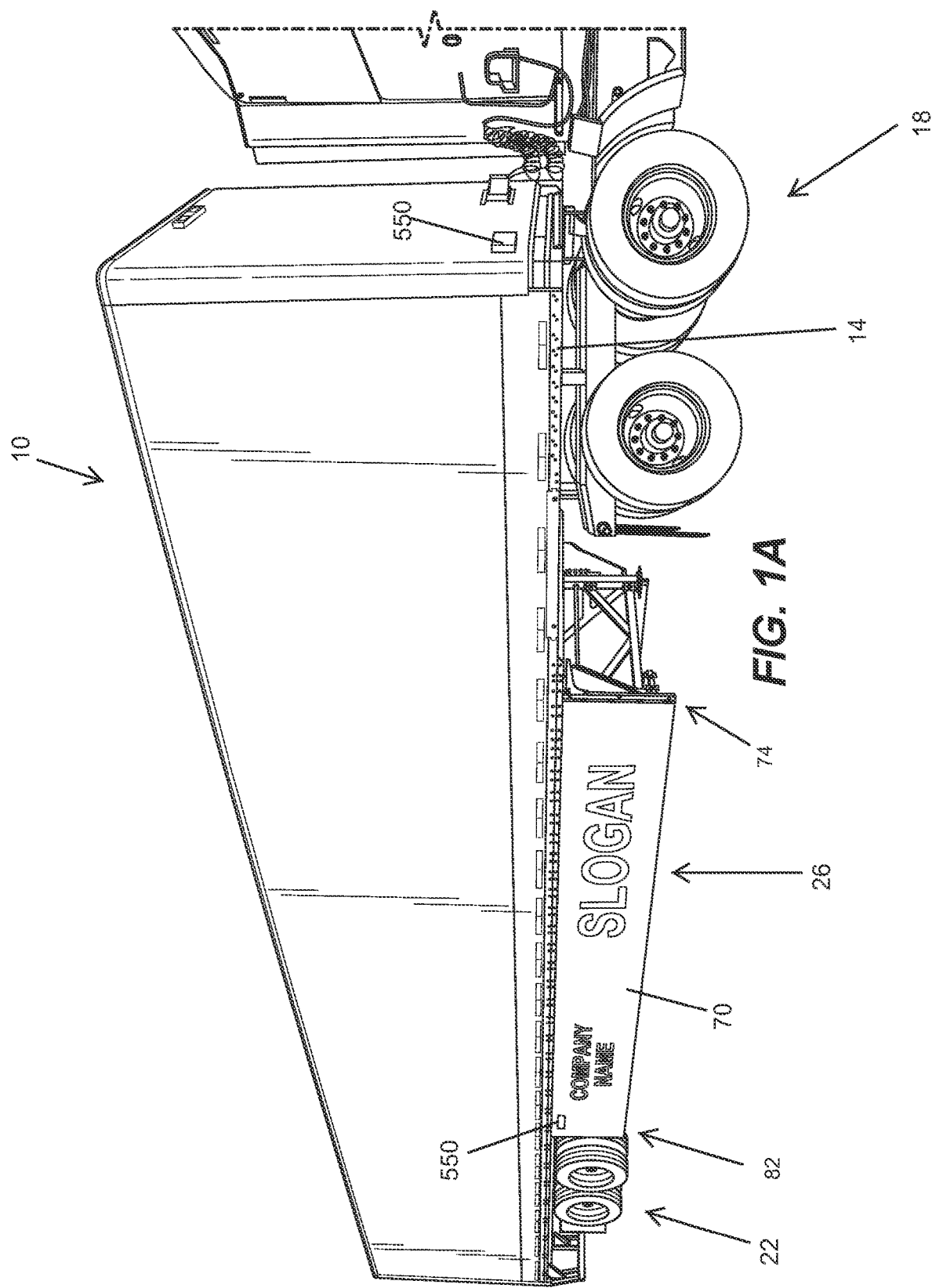
FIG. 1A illustrates a perspective view of a vehicle including a skirt assembly according to one embodiment.
FIG. 1B illustrates a skirt assembly according to another embodiment for use with the vehicle of FIG. 1A.

Both the foregoing general description and the following detailed description are exemplary and explanatory only and are not restrictive of the features, as claimed. As used herein, the terms "comprises," "comprising," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal."

DETAILED DESCRIPTION

FIGS. 1A, and 2-5 illustrate an exemplary vehicle 10 for transporting freight or cargo and including a frame 14, a first set of wheels 18, a second set of wheels 22, a first skirt assembly 26, a second skirt assembly 26, fairings 30, and protective elements 34 (e.g., a rub rails) according to a first embodiment. A light source 38 (e.g., LED strip) coupled to either or both of the first and second skirt assemblies 26, the frame 14 adjacent the skirt assemblies 26, and/or elsewhere on the vehicle 10. In some embodiments, the light source 34 is electrically coupled to the vehicle 10 circuitry such that the light source is powered when the headlights of the vehicle 10 are powered.

As shown in FIG. 1A, the vehicle 10 is a semi-truck including a truck (e.g., a tractor truck) that has a frame and a cargo portion or trailer that has its own frame and is removably coupled to frame of the truck. In other or additional embodiments, the vehicle 10 may be a box truck or straight truck including a truck and a cargo portion or box that is irremovably coupled to the truck. The truck and box of the box truck share a frame 14. Although the embodiments of the skirt assemblies 18 and other features are shown and described herein are shown as being used with a semi-truck, the skirt assemblies 18 and other features shown and described herein may be used with box trucks as well.

Figure 2:
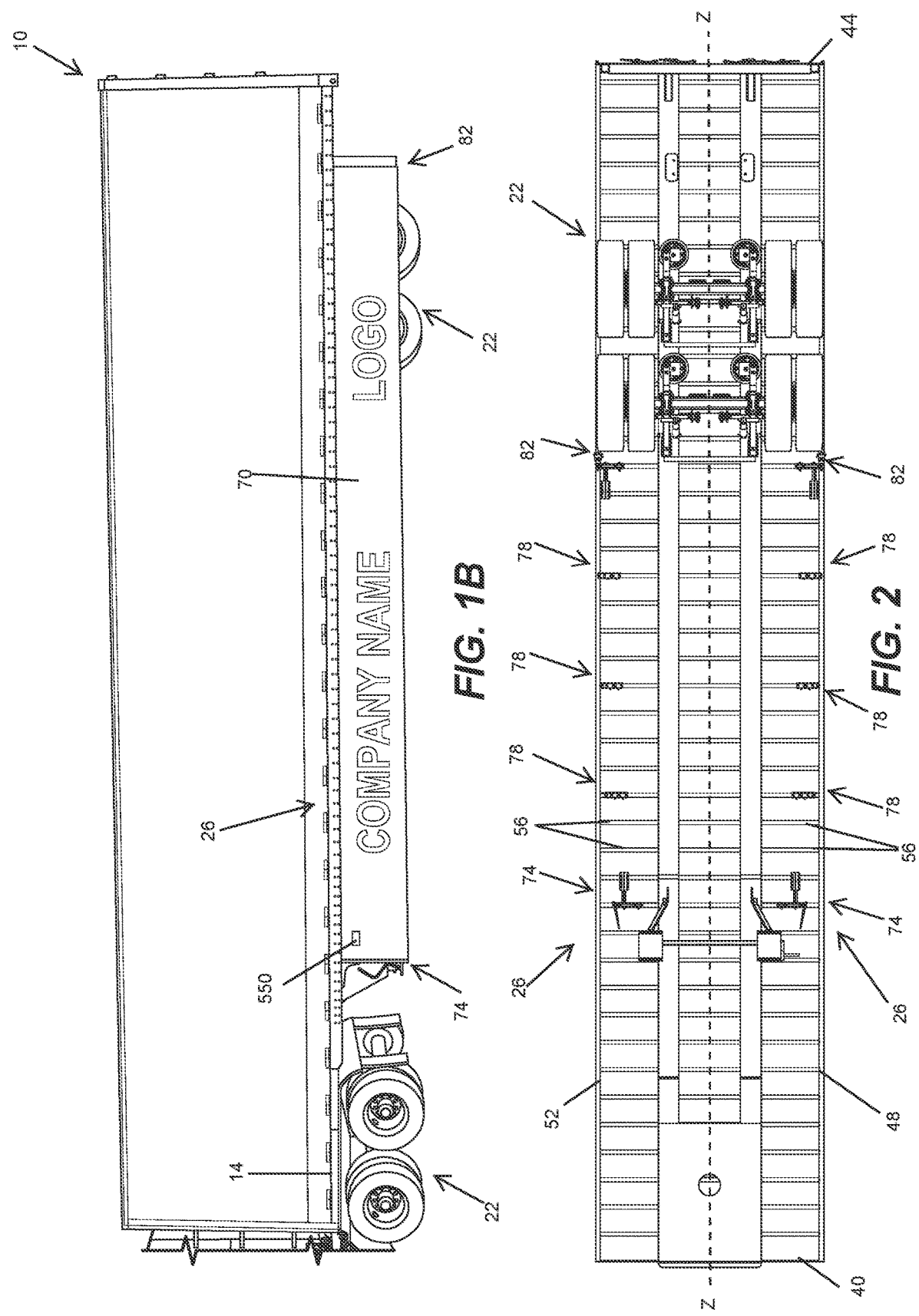
FIG. 2 illustrates a bottom view of the vehicle and the skirt assembly of FIG. 1A.
Figure 3:
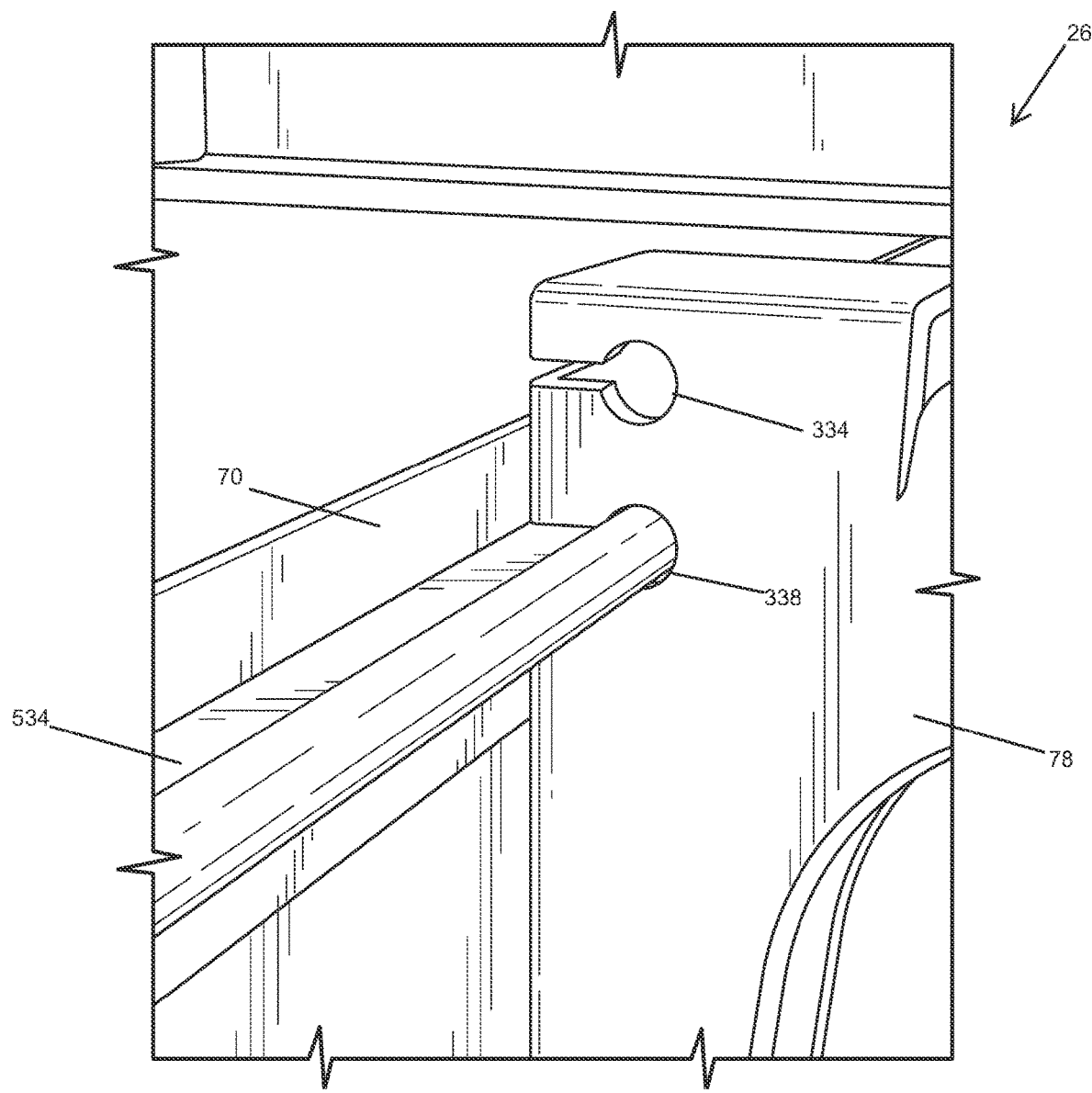
FIG. 3 illustrates a detailed view of a portion of the skirt assembly of FIGS. 1A and 1B.

With respect to FIG. 2, in either case, the frame 14 includes a first end 40, a second end 44 opposite the first end 40, a longitudinal axis Z extending along a length of the frame 14 between the first end 40 and the second end 44, a first side 48 positioned on a first side of the longitudinal axis Z, a second side 52 positioned on a second side of the longitudinal axis Z, and supports or I-beams 56 extending between the first side 48 and the second side 52 of the frame 14. As shown, the I-beams 56 are positioned perpendicular relative to the longitudinal axis Z of the trailer. Different vehicles may include different spacing of the adjacent I-beams (e.g., every 8 inches, every 10 inches, every 12 inches, etc.) along the length of the vehicle 10.

The first skirt assembly 26 is positioned on the first side 48 of the frame 14 and the second skirt assembly 26 is positioned on the second side 52 of the frame 14. The first and second skirt assemblies 26 reduce the weight of the vehicle 10 and reduce drag (e.g., deflect air), which helps make the vehicle 10 more aerodynamic. Additionally, first and second skirt assemblies 26 help to reduce spray and/or splashing of fluid on the ground. Although only the first skirt assembly 26 is discussed in detail herein, the second skirt assembly has the same features.

FIGS. 2, 3, and 6-15 illustrate the first skirt assembly 26 in greater detail. As shown, the first skirt assembly 26 includes a skirt 70, a front or anchor mount 74, a first support mount 78, a second support mount 78, a third support mount 78, and a rear or winch mount 82 (e.g., a tensioning mount, a mount with a tensioning device, etc.). Although there are three support mounts 78 shown in the illustrated embodiment, there may be more or fewer support mounts 78 in other embodiments. In some embodiments, not shown, the front mount 74 may also be configured as winch mount 78. As shown, first skirt assembly 26 includes a skirt 70 that is movably coupled to each of the mounts 74, 78, 82, which together couple the skirt 70 to the frame 14. In this embodiment, mounts 74, 78, 82 are sequentially coupled to the frame of the vehicle 10 from a position adjacent the first set of wheels 18 to a position adjacent the second set of wheels 22 and are evenly spaced along the frame 14.I In other embodiments, the mounts 74, 78, 82 may be unevenly spaced, for example, to support skirt 70 in more critical positions. For example, in the illustrated embodiment, the front mount 74 (and therefore the skirt) is mounted to or adjacent to the landing gear at a front portion of the frame. In other embodiments, the front mount 74 may be positioned adjacent to and behind a mud flap or a mud flap bracket adjacent to and behind the first set of wheels 18. Coupling the skirt 70 at or adjacent to the landing gear or mud flap behind the first set of wheels 18 helps the skirt 70 to resist forces (e.g., against turbulent wind or other air forces) at the first end 40 of the vehicle. Moreover, in the embodiment of FIGS. 1A and 2, the winch mount 82 (and therefore the skirt 70) is mounted adjacent to and in front of the second set of wheels 22. In still other embodiments, such as that shown FIG. 1B, the winch mount 82 may be positioned behind a rear of a mud flap or a mud flap bracket (e.g., behind the second set of wheels 22). In other embodiments (discussed in greater detail below with respect to FIGS. 21-22), the skirt 70 may be mounted directly or indirectly to a rear guard of the vehicle 10.

In other embodiments, all or some of the mounts 74, 78, 82 are formed of a rigid yet lightweight material. For example, all or some of the mounts 74, 78, 82 are formed of steel in the illustrated embodiments. Additionally, in the illustrated embodiments, all or some of the mounts 74, 78, 82 include a corrosion prevention coating (e.g., Linex). In other embodiments, all or some of the mounts 74, 78, 82 may be formed of other types of materials and have other types of corrosion prevention coatings.

Figure 6:
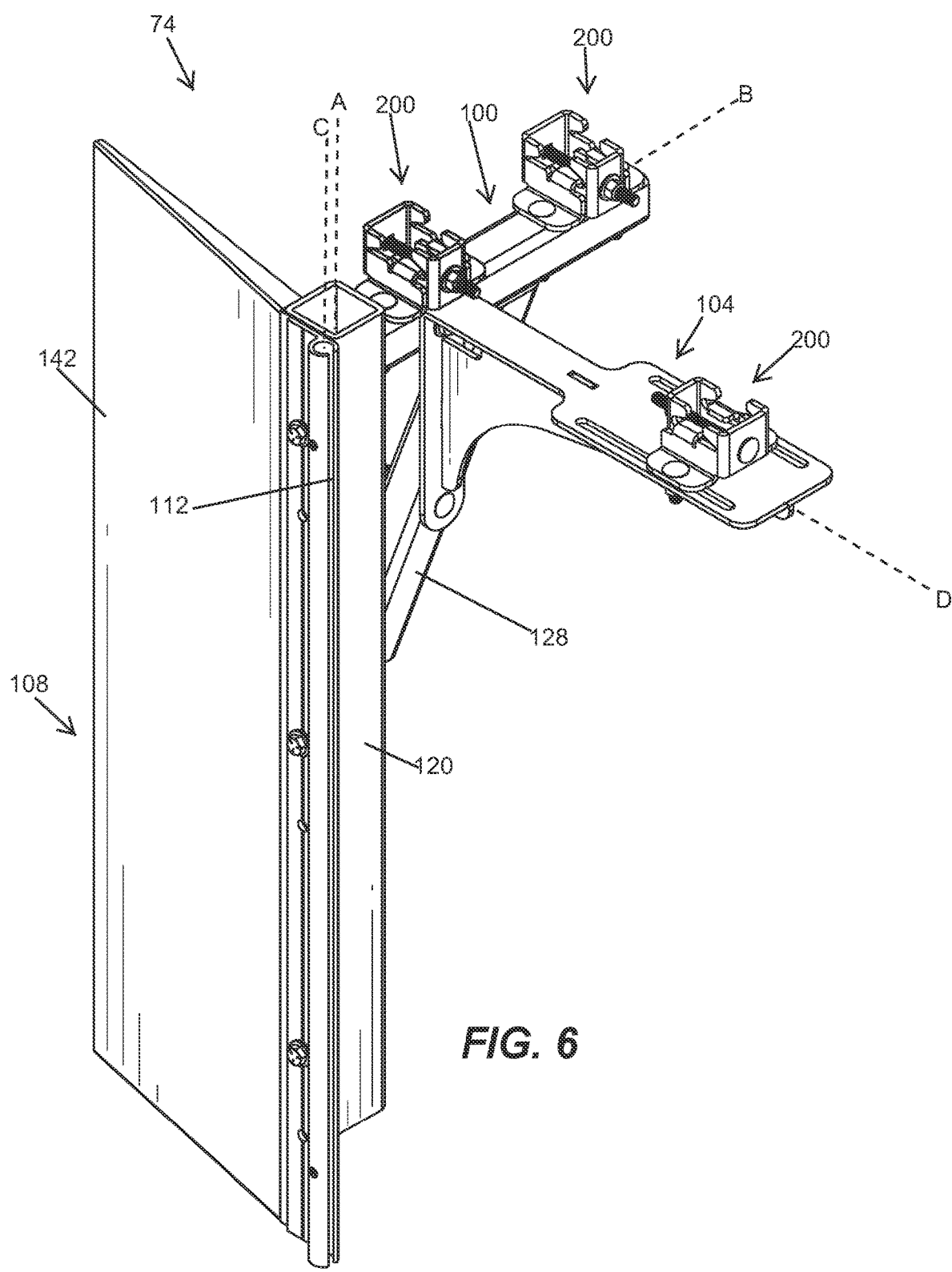
FIG. 6 illustrates a perspective view of a front mount of the skirt assembly of FIGS. 1A and 1B.
Figure 7:
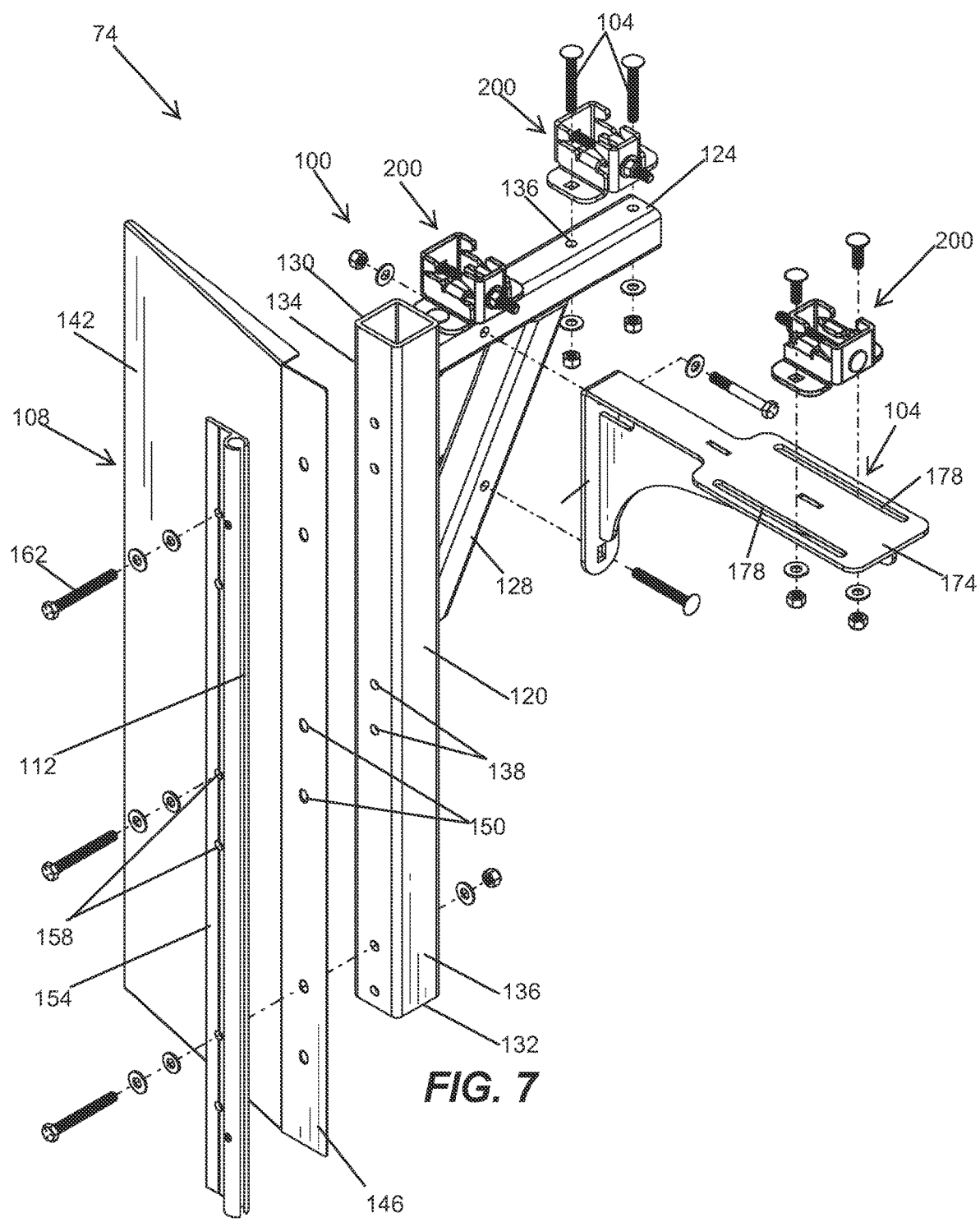
FIG. 7 illustrates an exploded view of the front mount of FIG. 6.

With respect to FIG. 6-7, the front mount 74 includes a body 100, a bracket 104, a wind deflection plate 108, and a channel 112. The body 100 includes a first leg 120, a second leg 124, and a support 128. The first leg 120 has a first end 130, a second end 132, a longitudinal axis A extending between the first end 130 and the second end 132, a first side 134, and a second side 136 opposite the first side 134. The first leg 120 also has a first mounting surface between the first side 134 and the second side 136, and defines a plurality of apertures 138. The second leg 124 includes a second longitudinal axis B and a second mounting surface. The third mounting surface defines a plurality of apertures 138. The first leg 120 and the second leg 124 define a substantially L-shape. That is, the longitudinal axes A, B are positioned at a substantially perpendicular angle relative to one another. The term substantially as used herein means plus or minus five degrees. The support 128 is coupled between the first leg 120 and the second leg 124.

The wind deflection plate 108 includes a body 142 extending from a mounting portion 146 having a plurality of apertures 150. The channel 112 extends from a mounting portion 154 having a plurality of apertures 158. The channel defines an axis C. The mounting portion 146 of the wind deflection plate 108 and the mounting portion 154 of the channel 154 are coupled to the body 100 by fasteners 162 (e.g., screws, pins, etc.). Specifically, the apertures 150, 158 of the mounting portion 146 of the wind deflection plate 108 and the mounting portion 154 of the channel 112 are aligned with respective apertures 138 of the first mounting surface of the first leg 120. A fastener 162 extends through each of the aligned apertures 138, 150, 158 to couple the wind deflection plate 108 to the first mounting surface of the first leg 120 and the channel 112 to the wind deflection plate 108. The axis C of the channel 112 is parallel to the longitudinal axis A of the first leg 120 of the body 100. As shown, the body 142 of the wind deflection plate 108 extends from the first leg 120 in a direction toward the first end 40 of the frame 14. The channel 112 extends from the first leg 120 in a direction toward the second end 48 of the frame 14. Accordingly, the wind deflection plate 108 and the channel 112 are positioned on opposite sides of the body 100 of the front mount 74. In the illustrated embodiment, a length of the wind deflection plate 108 and the channel 112 is longer than a length of the first leg 120. In one embodiment, the length of the first leg 120 of the front mount 74 measures 22 inches and the length of the channel 112 measures 30 inches. The lengths of the first leg 120 and the channel 112 may have other suitable dimensions.

In the illustrated embodiment the wind deflection plate 108 is steel, although in other embodiments the wind deflection plate may be plastic or another suitable material. In other embodiments, the wind deflection plate 108 may be additionally or alternatively coupled to the winch mount 78. The wind deflection plate 108 reduces drag on the vehicle 10. The outer surface of the body 142 of the wind deflection plate 108 is usable for graphical representations. Logos or other advertising indicia (not shown) are included on the outer surface of the body 142 using a poly coating, paint, or both. Of course, other suitable coating/paint combinations may alternatively be applied to the outer surface of the body 142 of the wind deflection plate 108.

The bracket 104 is coupled to either or both sides of the body 100 depending on which side of the vehicle 10 the front mount 74 is positioned and how much support is required by the front mount 74. The bracket 104 is substantially L-shaped, and includes a first leg 170 and a second leg 174 coupled to the first leg 170 at a substantially perpendicular angle. The second leg 174 of the bracket 104 defines a third longitudinal axis D and a third mounting surface. The third mounting surface defines elongated apertures 178 extending through opposite sides thereof. In other embodiments, the elongated apertures 178 may be replaced with a plurality of discrete apertures. The first leg 170 is coupled to the body 100. Specifically, the first leg 170 is coupled (e.g., by fasteners or the like) to the second leg 124 and the support 128 such that the longitudinal axis D is oriented perpendicular to the longitudinal axis B and the third mounting surface extends is in the same plane as the second mounting surface.

As shown in FIGS. 6-7, a first clamp 200, a second clamp 200, and third clamp 200 are supported by the front mount 74 removably secure (e.g., rigidly couple) the front mount 74 to the frame 14 of the vehicle 10 without drilling into or otherwise modifying the frame 14. Specifically, the first clamp 200 and the second clamp 200 are supported on the second mounting surface of the second leg 124 and the third clamp 200 is supported on the third mounting surface of the bracket 104. The first clamp 200, the second clamp 200, and the third clamp 200 are coupled to the respective mounting surface by fasteners 204 for example. In the illustrated embodiment, the position of clamps 200 correspond to one of I-beams of the frame.

Figure 8A:
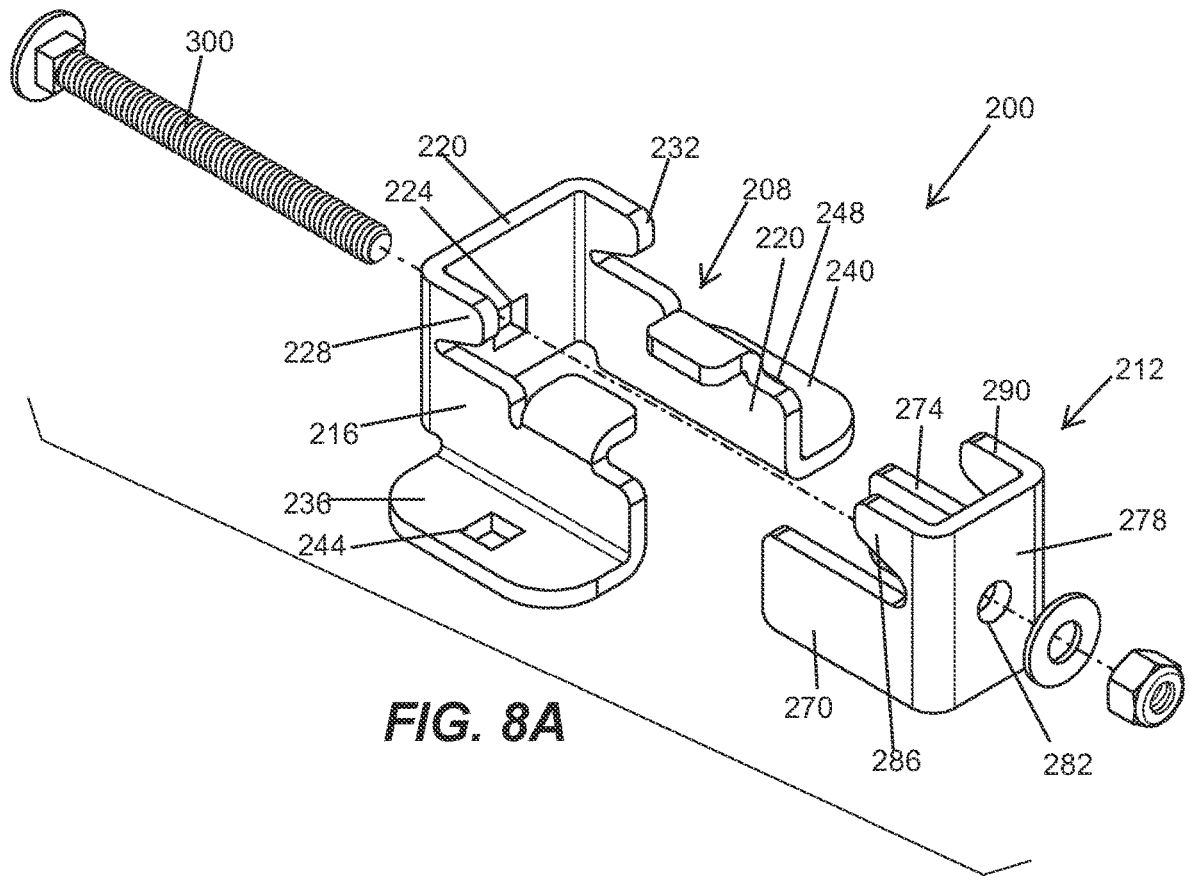
FIG. 8A illustrates a clamp according to one embodiment that is useable with the skirt assembly of FIGS. 1A and 1B.
Figure 8B:
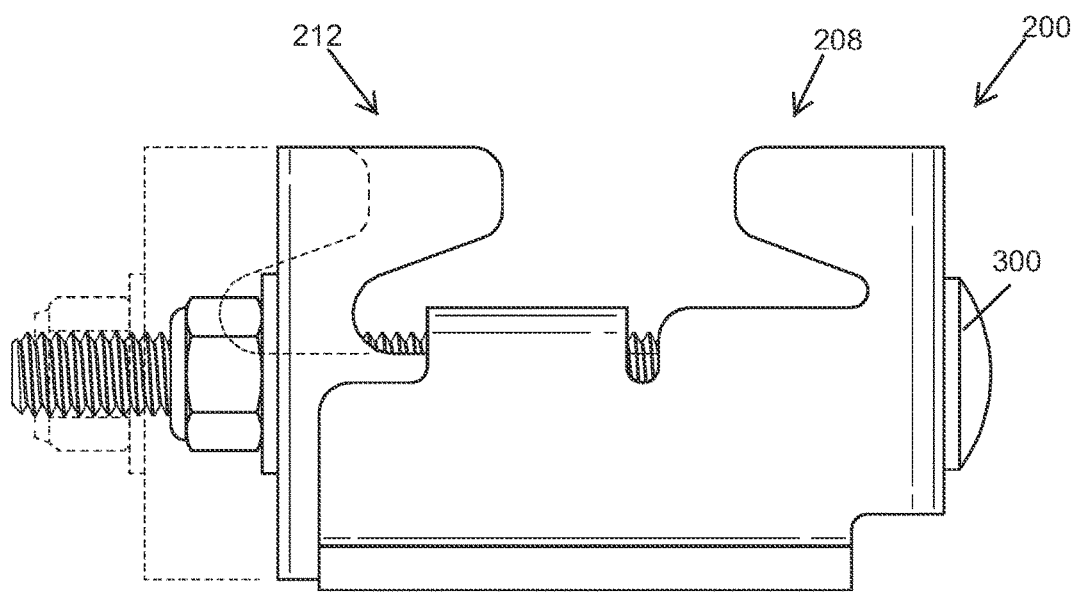
FIG. 8B illustrates a side view of the clamp of FIG. 8A.

With respect to FIGS. 8A-8B, one embodiment of the clamps 200 is shown in greater detail. Further with respect to FIGS. 8A-8B, each of the first, second, and third clamps 200 include the same features, so the following discussion applies to all three although only the first clamp 200 is described in detail. The first clamp 200 includes a first or fixed clamp portion 208 and a second or movable clamp portion 212 that is movably secured to the fixed clamp portion 208. In the embodiment illustrated in FIGS. 8A-8B, the movable clamp portion 212 is separately formed from the fixed clamp portion 208. The fixed clamp portion 208 includes a body with a first leg 216 coupled to a second leg 220 by an intermediate portion 224. The intermediate portion 220 includes a first aperture 224 extending therethrough. A first width is defined by a gap between the first leg 216 and the second leg 220 of the fixed clamp portion 208. A first projection 228 and a second projection 232 extend from opposite sides of the intermediate portion 220. The first projection 228 is positioned adjacent to, aligned with, and parallel to the first leg 216. Similarly, the second projection 232 is positioned adjacent to, aligned with, and parallel to the second leg 220. The first and second projections 228, 232, together, form a fixed clamp arm.

The body also includes a first mounting tab 236 coupled to the first leg 216 and a second mounting tab 240 coupled to the second leg 220. The mounting tabs 236, 240 each include an aperture 244, 248 that aligns with a corresponding aperture 138, 178 in the respective mounting surface. A fastener 250 (e.g., screws, bolts, square-headed bolts that allow tightening/loosening with one hand, etc., shown in FIG. 9A) or other suitable fastening element is received through the aligned apertures to secure the fixed clamp portion 208 to the respective mounting surface. The position of the fixed clamp portion 208 are adjustable, in some cases, to correspond to different frame configurations. For example, the apertures 244, 248, in the mounting tabs 236, 240 of the fixed clamp portion 208 of the third clamp 200 align at any position along the respective elongated aperture 178 of the third mounting surface of the bracket 104.

The movable clamp portion 212 includes body with a first leg 270 coupled to a second leg 274 by an intermediate portion 278. The intermediate portion 278 includes a first aperture 282 extending therethrough. A second width is defined by a gap between the first leg 270 and the second leg 274 of the movable clamp portion 212. A first projection 286 and a second projection 290 extend from opposite sides of the intermediate portion 278. The first projection 286 is positioned adjacent to, aligned with, and parallel to the first leg 270. Similarly, the second projection 290 is positioned adjacent to, aligned with, and parallel to the second leg 274. The first and second projections 286, 290, together, form a movable clamp arm. As shown, the second width is smaller than the first width such that the movable clamp portion 212 is positioned within the gap between the first leg 216 and the second leg 220 of the fixed clamp portion 208 and the apertures 224, 282 of the intermediate portions 220, 278 are aligned to receive a fastener 300 (e.g., screws, bolts, square-headed bolts that allow tightening/loosening with one hand, etc.) therethrough.

In the embodiment illustrated in FIGS. 8A-8B, the movable clamp portion 212 is movable relative to the fixed clamp portion 208 by the fastener 300 between a first unclamped position in which the clamp arms are spaced apart from one another by a first distance and a second clamped position in which the clamp arms are spaced apart from one another by a second distance that is less than the first distance. When in the unclamped position, the first distance is wide enough to allow the clamp arms to be positioned around the respective I-beam 56. In the clamped position, the second distance is sufficient to prevent the clamp arms from releasing the respective I-beam 56.

Figure 9A:
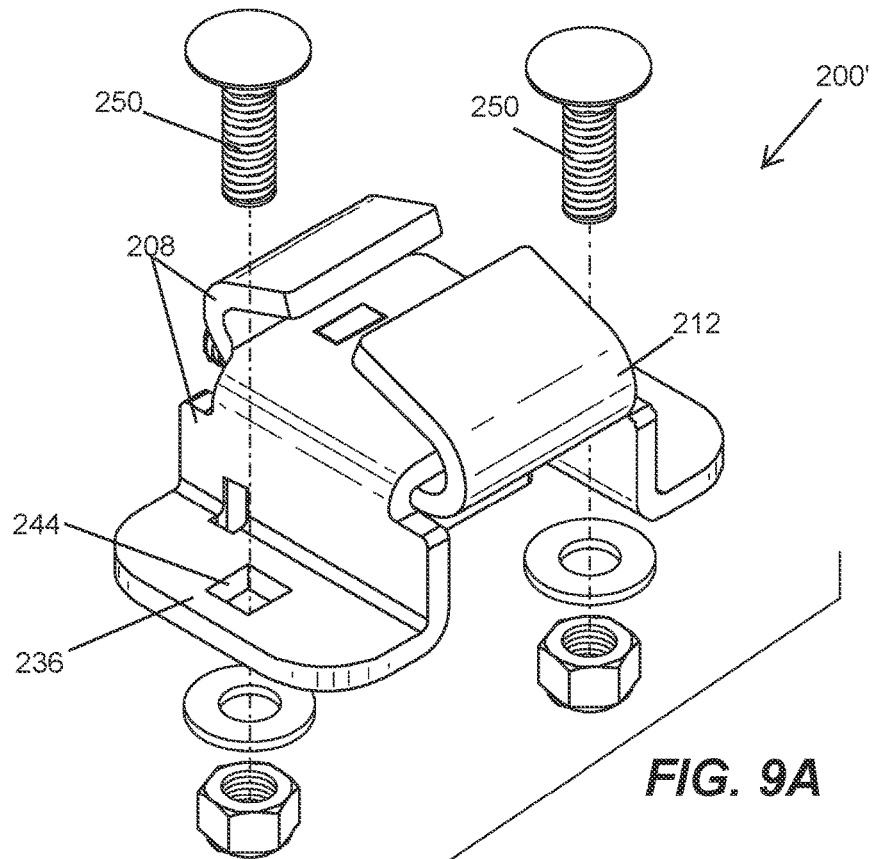
FIG. 9A illustrates a clamp according to another embodiment that is useable with the skirt assembly of FIGS. 1A and 1B.
Figure 9B:
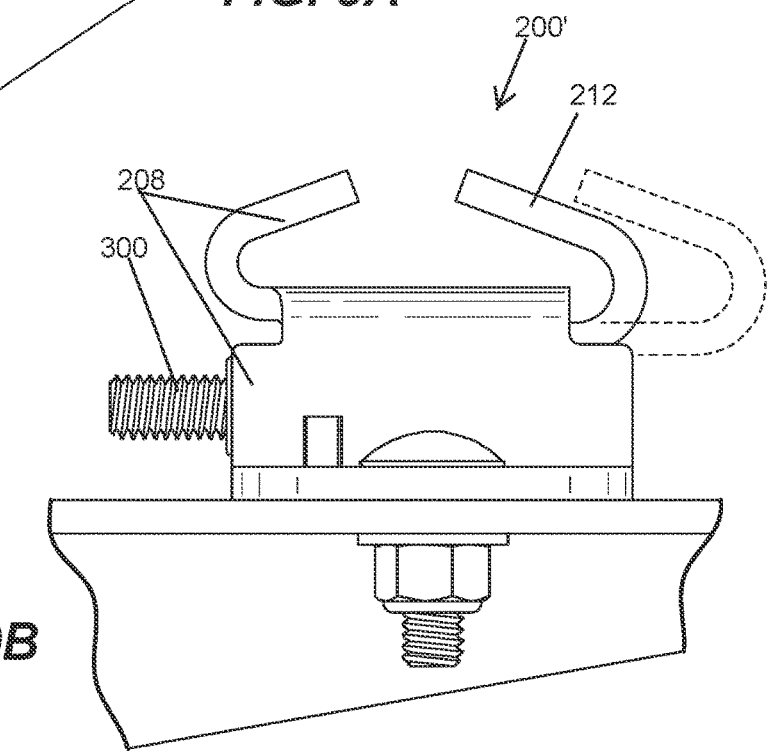
FIG. 9B illustrates a side view of the clamp of FIG. 9A.
Figure 10:
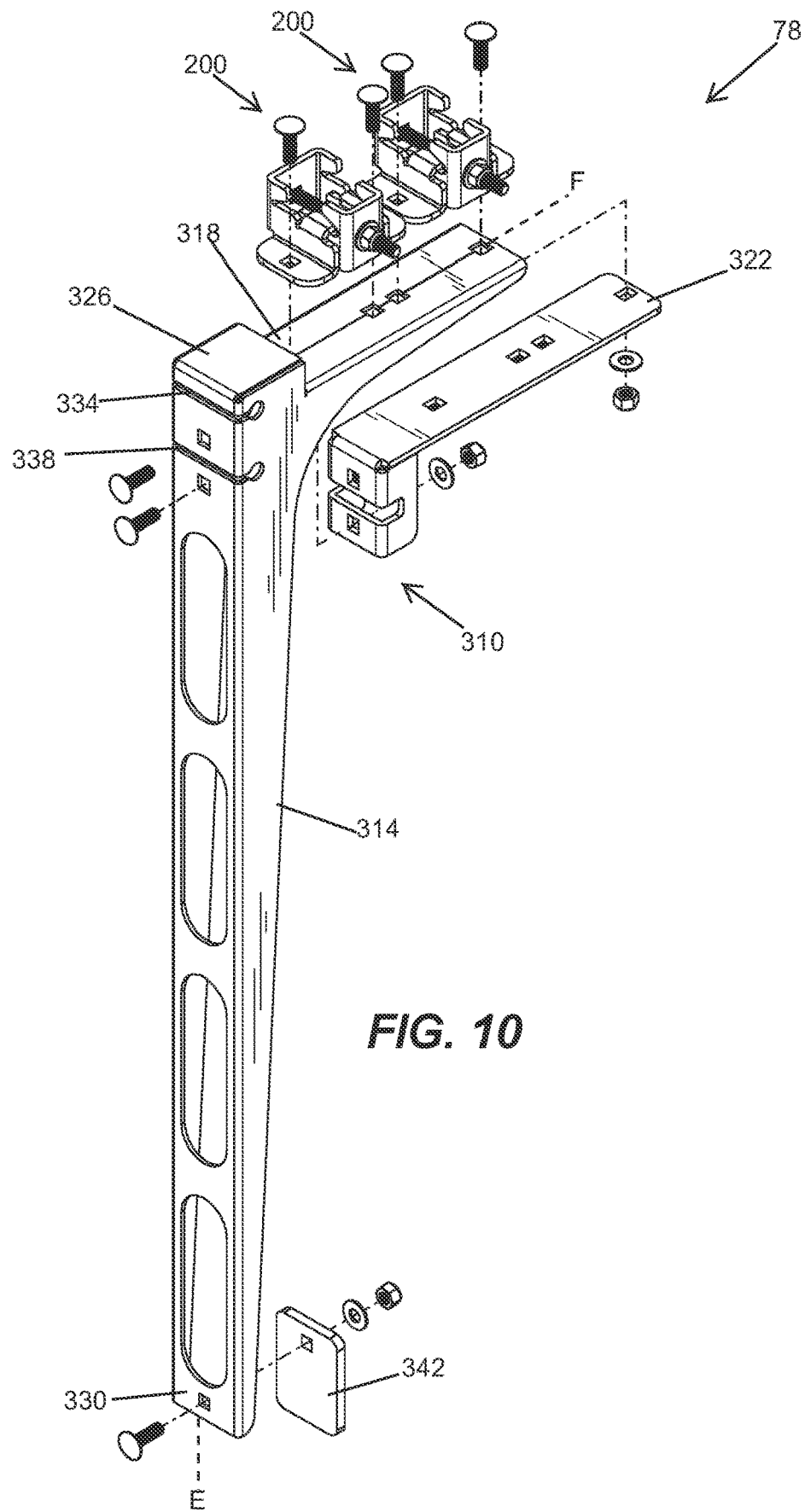
FIG. 10 illustrates a perspective view of a support mount of the skirt assembly of FIGS. 1A and 1B.

Another embodiment of the clamps 200' is shown in FIGS. 9A-9B, and are similar to that of the FIGS. 8A-8B; therefore only the differences will be discussed. In the embodiment of FIGS. 9A-9B, the fixed clamp portion 208 includes a one-piece fixed clamp arm. The movable clamp portion 212 includes a one-piece movable clamp arm. Like the embodiment of FIGS. 8A-8B, in the embodiment illustrated in FIGS. 9A-9B, the movable clamp portion 212 is movable relative to the fixed clamp portion 208 by a fastener 300 (FIG. 9B) between the first unclamped position and the second clamped position.

The support mounts 78 help to couple skirt 70 to the vehicle 10 and to support skirt 70 against wind as the trailer moves through the air. All the support mounts 78 are the same; therefore, although only the first support mount 78 is discussed in detail, the second and third support mounts 78 have the same features. With respect to FIG. 10, the first support mount 78 includes a body 310 that has a first leg 314, a second leg 318, and a support 322. The first leg 314 has a first end 326, a second end 330, a longitudinal axis E extending between the first end 326 and the second end 330, a first slot or channel 334 positioned adjacent an end of first leg 314, and a second slot or channel 338 positioned adjacent the first slot 334. Each of the first and second slots 334, 338, extend the width of the first leg 310 and are oriented perpendicular to the longitudinal axis E. The second leg 318 includes a second longitudinal axis F and a mounting surface. The first leg 314 and the second leg 318 define a substantially L-shape. That is, the longitudinal axes E, F are positioned at a substantially perpendicular angle relative to one another. The support 322 is coupled between the first leg 314 and the second leg 318 and helps stiffen or otherwise support the body 310 of the support mount 78. The support 322 acts as a stiffening plate to strengthen the support mount 78.

The first mounting surface supports clamps 200, which secure the support mounts 78 to the frame of the vehicle 10. The clamps 200 are coupled to and between the support mount 78 and the frame 14 as discussed above with respect to FIGS. 8A-9B. In the illustrated embodiment, a length of the first leg 314 of the support mounts 78 is the same as the length of the channel 112 of the front mount 74 (e.g., 30 inches). In other embodiments, the length of the first leg 314 of the support mounts 78 may have other suitable dimensions. In still other embodiments, the length of the first leg 314 of the support mounts 78 may be different than the length of the channel 112. In some embodiments, an extender 342 may be removably coupled (e.g., via a fastener or the like) to the second end 330 of the first leg 314 to extend the length of the first leg 314. The extender 342, when used, protects the support mount 78. If the support mount 78 takes a strike, the extender 342 is designed to snap off, saving the support mount 78 and the skirt 70.

Figure 12:
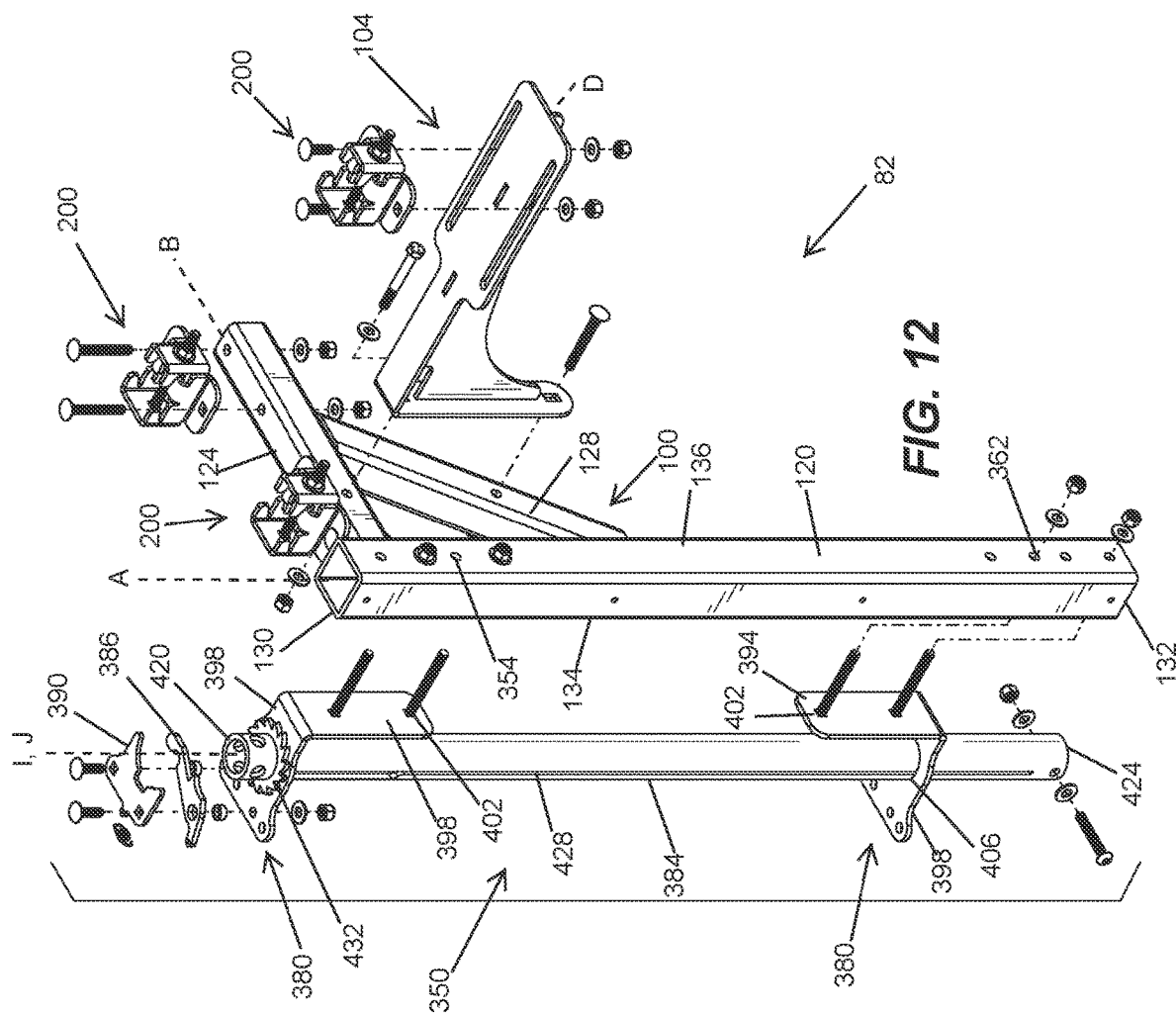
FIG. 12 illustrates an exploded view of the tensioning mount of FIG. 11.
Figure 11:
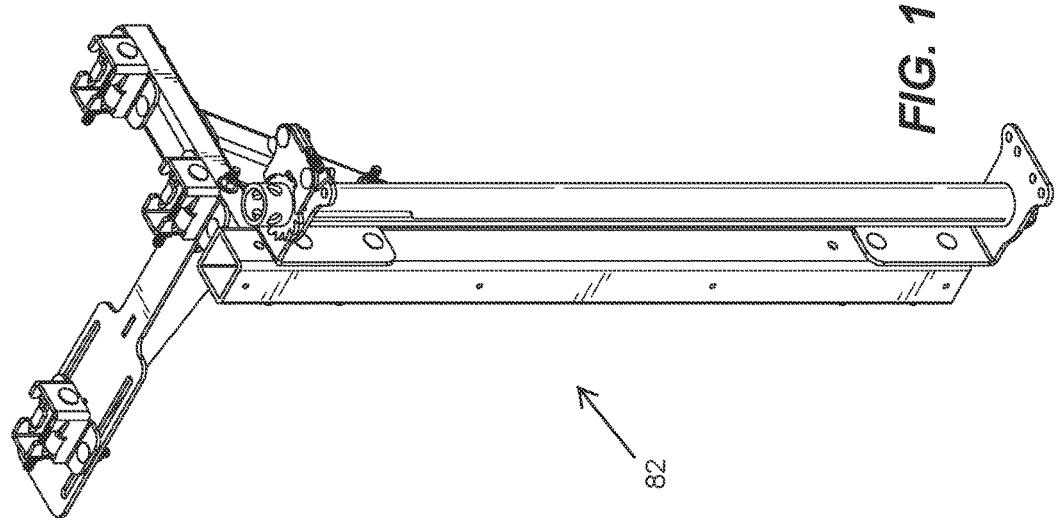
FIG. 11 illustrates a perspective view of a tensioning mount of the skirt assembly of FIGS. 1A and 1B, including a tensioning device positioned on a first side.
Figure 13:
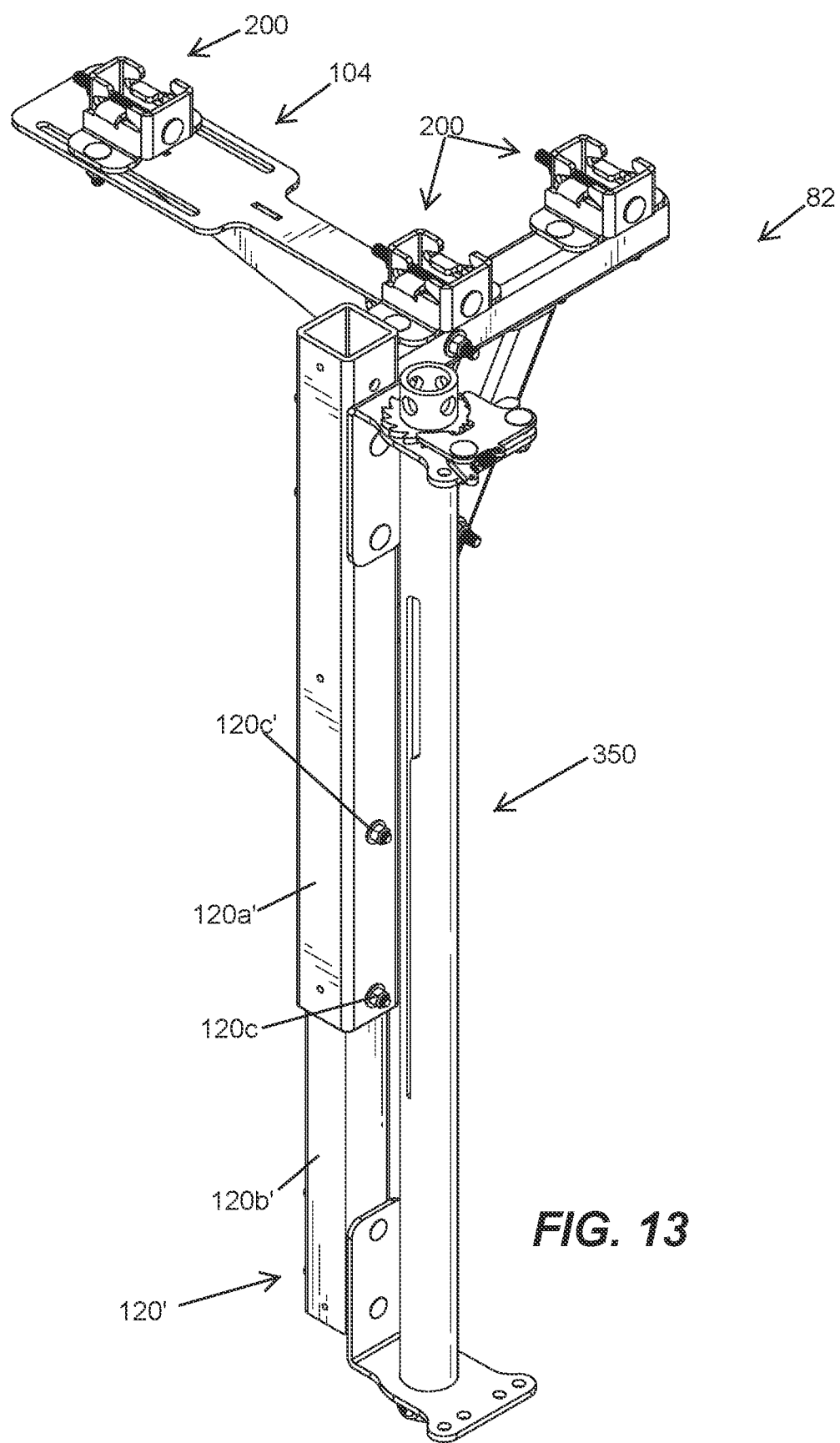
FIG. 13 illustrates a perspective view of the tensioning mount of FIGS. 1A and 1B, the tensioning device being positioned on a second side.

With respect to FIGS. 11-13, the winch mount 82 includes a body 100, a bracket 104, and a winch 350. The body and the bracket 104 of the winch mount 82 are similar to the body 100 and the bracket 104 of the front mount 74, and only the differences are discussed herein. As shown, each of the first and second sides 134, 136 of the first leg 124 have a plurality of first or upper apertures 354 positioned at or adjacent the first end 130 and a plurality of second or lower apertures 362 positioned at or adjacent the second end 132. Each of the plurality of upper apertures 354 on the first side 134 is aligned with one of the plurality one of the plurality of upper apertures 354 on the second side 136. Similarly, each of the plurality of lower apertures 362 on the first side 134 is aligned with one of the plurality of lower apertures 362 on the second side 136. The winch mount 82 supports clamps 200, which help secure the winch mount 82 to the frame of the vehicle 10. The clamps 200 are coupleable to the frame 14 as discussed above with respect to FIGS. 8A-9B.

In some embodiments, shown in FIG. 13, the first leg 120 may be a telescoping leg 120'. In this case, the first leg 120' has a first portion 120a' and a second portion 120b' that is received within and movably coupled relative to the first portion 120a'. The position of second portion 120b' relative to first portion 120a' is locked via one or more locking elements 120c'. Accordingly, the height of leg 120' is adjusted to provide a higher clearance for the skirt assembly 26 when the vehicle 10 is backing up a ramp, is close to a curb, etc. While not explicitly shown, it should be understood that the first legs 120, 314 of the front mount 74 and the support mounts 78 may be telescoping legs also and have similar features to the telescoping leg 120'.

The winch 350 is movably (e.g., rotatably, pivotably) coupled to the body 100 by a first bracket 380 and a second bracket 380. The winch 350 includes pipe or shaft 384, a pawl 386, and a pawl plate 390.

The first bracket 380 is positioned at or adjacent the first end 130 of the first leg 120 of the body 100 and the second bracket 380 is positioned at or adjacent the second end 132 of the first leg 120 of the body 100. The first bracket 380 and the second bracket 380 are L-shaped and have a first leg 394 and a second leg 398 extending from the first leg 394 at a substantially perpendicular angle. The first leg 394 of each of the first and second brackets 380 includes a pair of apertures 402 extending therethrough. The second leg 398 of each of the first and second brackets 380 includes an aperture 406 extending therethrough. The pair of apertures 402 of the first leg 394 of the first bracket 380 are aligned with a pair of the plurality of upper apertures 354 on either the first or second side 134, 136 of the body 100. The pair of apertures 402 of the first leg 394 of the second bracket 380 are aligned with a pair of the plurality of lower apertures 362 on either the first or second side 134, 136 of the body 100. Fasteners couples the first and second brackets 380 to the body 100. When the first and second brackets 380 are coupled to the body 100, the apertures 406 of the second legs 398 of the first and second brackets 300 are aligned along an axis I, which is parallel to the longitudinal axis A of the body 100.

The shaft 384 includes a first end 420, a second end 424, a longitudinal axis J extending between the first end 420 and the second end 424, and a slot or channel 428 extending parallel to the longitudinal axis J. A first portion of the channel 428 adjacent the first end 420 has a first thickness, and a second portion of the channel 428 extending from the first portion of the channel 428 has a second thickness that is less than the first thickness. A plurality of teeth 432 extend about the perimeter of the shaft 384 adjacent the first end. The teeth 432 are oriented in a first direction or a second direction depending on which side of the frame the winch mount 82 is positioned, and therefore which side of the body 100 the winch 350 is positioned.

As shown, the apertures 406 in the second legs 398 of the first and second brackets 380 receive the shaft 384 such that the longitudinal axis J of the shaft is aligned with the axis I. The teeth 432 are supported on the second leg 398 of the first bracket 380. The second leg 398 of the first bracket 380 also supports the pawl 386 and the pawl plate 390 adjacent the teeth 432. As shown, the pawl 386 is positioned between the pawl plate 390 and the second leg 398 of the first bracket 380. The pawl 386 is pivotably coupled to the second leg 398 of the first bracket 380. The pawl 386 is biased by a spring 436 or other biasing mechanism into engagement with the teeth 432 of the shaft 384. The shaft 384 is rotatable relative to the first and second brackets 380, and therefore the body 100 of the winch mount 82. Together, the teeth 432, pawl 386, and pawl plate 390 control the rotation of shaft 384.

With respect to FIGS. 14-15, the skirt 70 includes a first end 500, a second end 504 opposite the first end 500, a top edge 508, a bottom edge 512 opposite the top edge 508, a longitudinal axis K extending along a length from the first end 500 and the second end 504, a first side 516, and a second side 520 opposite the first side 516. In the illustrated embodiment, a height of the skirt 70 measured between the top edge 508 and the bottom edge 512 is constant along the length of the skirt 70. The constant height of the skirt measures 27 inches to 33 inches (e.g., 30 inches) in some embodiments. In other embodiments, the height of the skirt 70 measured between the top edge 508 and the bottom edge 512 may be vary along the length of the skirt 70, as discussed below with respect to FIGS. 17A-19. For example, skirt 70 may gradually decrease in height from the front mount 74 to winch mount 82. In such embodiments, the second end 504 may be 20 inches to 24 inches (e.g., 22 inches).

The skirt 70 is formed from a pliable material that achieves a taut and smooth surface when engaged to a predetermined tension, as will be discussed in greater detail below. For example, in some embodiments, the skirt 70 is formed from a fabric material, such as, vinyl fabric. In one embodiment, the skirt 70 is formed from a 28 ounce vinyl fabric coated with a clear acrylic. In the illustrated embodiment, the skirt 70 is formed from a single solid piece of material. In other embodiments, the skirt 70 may be formed from two or more pieces of material that are coupled to one another or movable relative to one another.

The skirt 70 includes a first or front coupling element 530 (e.g., Keder tab, elongated projection, or rod) coupled at or adjacent the first end 500, multiple support coupling elements 534 (e.g., Keder tabs, elongated projections, or rods) coupled at or adjacent the top edge 508, and a second or rear coupling element 538 (e.g., a Keder tab, elongated projection, or rod) coupled at or adjacent the second end 504. The first and second coupling elements 530, 538 extend perpendicular to the longitudinal axis K. The support coupling elements 534 extend parallel to the longitudinal axis K. In the illustrated embodiment, the support coupling elements 534 are coupled to the first surface 516 of the skirt 70. In the illustrated embodiment, there are three support coupling elements 534 that have the same length and are positioned at equal intervals along the length of the skirt. In the illustrated embodiment, the support coupling elements 534 correspond to the number of support mounts 78 of the first skirt assembly 26. In other embodiments, the support coupling element 534 may be a single coupling element that extends along all or a portion of the top edge 508. In other embodiments, there may be fewer coupling elements 534 than support mounts 78. In the illustrated embodiment, the coupling elements 530, 534, 538 are each formed as a vinyl Keder tab that is heat sealed to the skirt 70. In other embodiments, the coupling elements may be formed of others suitable materials and have other suitable configurations. The projection also allows a resistance to gravity in the vinyl panel, allowing it to lay flat. In the illustrated embodiment, the skirt further includes a cut out-out or aperture 542 extending therethrough. The cut-out 542 provides access or visual inspection to an element or portion of frame 14 (e.g., a diesel reefer fuel tank coupled to the bottom of frame) that is otherwise obscured by the skirt 70. The cut-out 542 serves as a gripping area for assembling the skirt 70 to the frame 14. The cut-out 542 has a perimeter and has a fabric doubler that is heat sealed to the perimeter. In some embodiments, the cut-out 542 may be selectively covered by a flap (not shown) secured to the skirt 70 adjacent the perimeter of via a fastener (e.g., a zipper, tie, button, Velcro, or another suitable fastener).

The second side 520 of the skirt includes a graphical representation (e.g., color advertisements, logos, contact information, etc.). In the illustrated embodiment, the graphical representation is printed directly on the fabric or other material that forms the skirt 70. In the other embodiments, the graphical representation may be permanently secured to (e.g., via adhesive, stitching, etc.) to the skirt 70. The graphical representations may include one or more advertisements for a fleet (e.g., a Fleet Promotional Service) as well as others (e.g., a Mobile Advertising Program). The light source 30, noted above, that may be coupled to the first skirt assembly 26 (e.g., the skirt 70 and/or one or more of the mounts) or the frame 14 adjacent the skirt 70 (rather than the vehicle 10) to increase the amount of time that the advertisements are visible without being distracting to other drivers.

The vehicle (e.g., one or more of the skirt 70, the cargo portion, and the frame 14) further includes a tracking device 550 (FIG. 28) coupled to and/or associated with the graphical representation in order to track the location of the graphical representation, which will be discussed in greater detail below.

The skirt 70 has an extended position in which the first and second ends 500, 504 are spaced apart from one another by the length and a storage position in which the skirt 70 is positioned in a roll. That is, the skirt 70, and therefore the graphical representation, is configured to be rolled up. The skirt 70 is shipped to a fleet owner when in the storage position. Then, the fleet owner or driver unrolls the skirt 70 into the extended position for quick and easy assembly onto one or more of their vehicles, as will be discussed below. In one example, if the skirt 70 is 30 inches (or less) in height, and as shown in FIG. 16, the skirt 70 is shipped in a 30 inch long shipping tube with a shipping label (e.g., a UPS label) on the tube addressed to the fleet owner. In other embodiments, one or more skirts 70 may be shipped to the fleet owner.

The skirt 70 may have other suitable configurations than that discussed above in FIGS. 11-13. The embodiment shown in FIG. 17A-17B is similar to that of FIGS. 11-13, so only the differences will be discussed. The height of the skirt 70 of FIGS. 17A-17B measured between the top edge 508 and the bottom edge 512 varies along the length of the skirt 70. In this embodiment, each of the first end 500 and the second end 504 of the skirt 70 has a height that is less than the maximum height of the skirt 70. Additionally, the skirt 70 includes a tapered portion 570 that transitions the height of the skirt 70 from the maximum height of skirt 70 to height of the first end 500. Moreover, as discussed with respect to other embodiments, the height of the skirt 70 tapers from maximum height to the height at the second end 504. Similarly, the coupling elements 530, 538 at each of the first and second ends 500, 504 also have a height that is less than the maximum height of skirt 70. For example, the coupling element 530 at the first end 500 measures 7 inches to 13 inches (e.g., 10 inches) compared to the maximum height of the skirt 70, which measures 27 inches to 33 inches (e.g., 30 inches). Further, the tapered portion 570 may occupy approximately 4 to 8 inches (e.g., 6 inches) of the first end 500 of the skirt 70. In this aspect, front mount 74 may configured as a winch mount 82. Accordingly, the coupling element 530 is received within channel 384, and the front mount 74 may be rotated to tighten skirt 70, in a similar manner as discussed below with respect to winch mount 82.

Furthermore, the skirt 70 includes a webbing 574 on the first side thereof as shown in FIGS. 17A-17B. Webbing 574 is positioned on at least a portion of the top edge 508 of skirt 70. Additionally, webbing 574 is also positioned on at least a portion of the bottom edge 512 of skirt 70. Each portion of webbing 574 may have any suitable height (e.g., 2 inches). One or more portions of webbing 574 include an inward arc (e.g., a 0.5 inch arc) toward a center of the frame 14 when skirt 70 is coupled to the frame. Webbing 574 is formed of one or more materials that may help form a seal (e.g., a heat seal) between the skirt 70 and the frame 14 or other components (e.g., the mounts) that help couple skirt 70 to the frame 14. Webbing 574 includes or is coupled to the coupling elements 534. In the embodiment of FIGS. 17A-17B, the coupling portions 534 are open portions of webbing 574. For example, the coupling elements 534 are formed of open webbing (e.g., webbing that is not heat sealed) to couple the skirt 70 to the respective support mounts 78. The coupling elements 534 include a 0.5-inch web strap that is coupled to (e.g., sewn) to webbing 574. Webbing 574 helps safely couple skirt 70 to the one or more of the support mounts 78. Webbing 574 also helps tension skirt 70.

The embodiment shown in FIG. 18 is similar to that of FIGS. 17A-17B, so only the differences will be discussed. Here, a height of the skirt of FIGS. 14, as measured between the top edge 508 and the bottom edge 512, varies along the length of the skirt 70. In this embodiment, only the second end 504 of the skirt 70 has a height that is less than the maximum height of the skirt 70. Additionally, the skirt 70 includes a tapered portion 578 that transitions the height of the skirt 70 from the maximum height of skirt 70 to the height of the second end 504. Similarly, the coupling element 538 at the second end 504 also has a height that is less than the maximum height of skirt 70. For example, coupling element 538 measures 7 inches to 13 inches (e.g., 10 inches) compared to the maximum height of the skirt, which measures 27 inches to 33 inches (e.g., 30 inches). Further, the tapered portion 578 occupies approximately 4 to 8 inches (e.g., 6 inches) of the second end 504 of the skirt 70.

The embodiment shown in FIG. 19 is similar to that of FIGS. 17A-17B, so only the differences will be discussed. Here, the skirt 70 includes one or more access cut-outs or apertures 542. For example, skirt 70 includes two access cut-outs 542. Access cut-outs 542 save time and/or effort for the operator by permitting access or visualization to area below the frame. The size, spacing, number, etc. of access cut-outs may vary depending on the size, shape, and other characteristics of skirt 70 and/or the vehicle to which the skirt 70 is coupled. In some embodiments, access cut-outs 542 may only be positioned on one of the skirts 70 (e.g., the skirt 70 on the driver's side) of the frame 14.

In another embodiment, the graphical representation is printed on a separate piece of material, such as a banner 586 (FIG. 20). In these aspects, the banner 586 and the skirt 70 are extendable and/or retractable together. In this example, the graphical representation may be changed for a new or different graphical representation quickly and easily, for example, but forcible uncoupling the banner 586 from the skirt 70.

As shown in FIG. 20, the banner 586 includes an advertisement or other graphical representation, and the banner 586 is attached to the second side 520 of the skirt by first and second coupling elements 590. In the illustrated embodiment, the coupling elements 590 are configured as channels or rails that receive Keder projections or tabs at or adjacent to the first and second ends of the banner 586. In the illustrated embodiment, the channels are spaced apart from the respective first and second ends 500, 504 of the skirt 70. Accordingly, the banner 586 has a length that is less than the length of the skirt 70. Moreover, as shown in FIG. 20, the banner 586 has a height that is less than the height of the skirt 70. For example, and as discussed above, the skirt 70 has a height of approximately 30 inches, and the banner 586 has a height of approximately 15 inches to 25 inches. In another example, the skirt 70 may have a larger height than 30 inches, and the banner 586 may have a height of approximately 30 inches. Additionally, the skirt 70 is formed of a thicker and/or heavier vinyl material, and the banner 586 is formed of a thinner and/or lighter vinyl material. In other embodiments, other suitable coupling elements 590 may be used in lieu of the channels and Keder projections. For example, the coupling elements 590 may be suitable fasteners, such as, hook and loop fasteners or snap-fit fasteners, for example. As shown in FIG. 20, if the graphical representation is printed on the banner 590, the tracking device(s) 550 is coupled to, embedded within, or otherwise coupled to the banner 586, for example.

As discussed above, the skirt 70 has an extended position in which the first and second ends 500, 504 are spaced apart from one another by the length and a storage position in which the skirt 70 is positioned in a roll (FIG. 16). Similarly, the banner 586 is configured to rolled up and into a storage position also. The skirt 70, the banner 586, or both may be shipped to a fleet owner when in the storage position. Then, the fleet owner or driver unrolls the skirt 70, the banner 586, or both into the extended position for quick and easy assembly onto one or more of their vehicles, as will be discussed below.

The first skirt assembly 26 is coupled to the frame 14 of the vehicle 10 as follows. The front mount 74 is coupled (via the clamps 200) to the frame 14 adjacent the first set of wheels 18. The winch mount 82 is coupled (via the clamps) to the frame 14 adjacent the second set of wheels 22. In the illustrated embodiment, the winch mount 82 is spaced apart from a second end of the vehicle 10 by about 16 feet. The support mounts 78 are coupled (via the clamps 831) to the frame 14 between the front mount 74 and the winch mount 82. As noted above, in the illustrated embodiment, the support mounts 78 are evenly spaced between the front mount 74 and the winch mount 82. The first legs 120, 314 of the mounts 74, 78, 82 each extend vertically relative to the frame 14 such that the longitudinal axes A, G thereof are substantially perpendicular to the longitudinal axis Z of the frame 14.

In the illustrated embodiment, the mounts 74, 78, 82 form a gradual arc along the length of the frame 14 and are therefore a tangent of the arc is oriented generally at an angle relative to the longitudinal axis Z of the frame 14. To this end and with respect to FIG. 2, the front mount 74 is spaced apart from the first side 48 of the frame 14 by a first distance. The first support mount 78 is spaced apart from the first side 48 of the frame 14 by a second distance that is less the first distance. The second support mount 78 is spaced apart from the first side 48 of the frame 14 by a third distance that is less the second distance. The third support mount 78 is spaced apart from the first side 48 of the frame 14 by a fourth distance that is less the third distance. The third support mount 78 is spaced apart from the first side 48 of the frame 14 by a fourth distance that is less the third distance. The winch mount 82 is spaced apart from the first side 48 of the frame 14 by a fifth distance that is less the fourth distance. In other embodiments, the mounts 74, 78, 82 may be aligned in a straight line that is substantially parallel to the longitudinal axis Z of the frame.

Once the mounts 74, 78, 82 are appropriately positioned, the first end 500 of the skirt is secured to front mount 74, the skirt 70 is secured to the support mounts 78, and the second end 504 of the skirt 70 is secured to the winch mount 82. Specifically, the coupling element 530 at first end 500 of the skirt is received in the channel 112 of the front mount 74. The coupling elements 534 adjacent the top edge 508 of the skirt 70 are then positioned in one of the slots 334, 338 of each of the support mounts 78. The same channel (either the first channel 334 or the second channel 338) of each support mounts 78 should receive the respective coupling element 534 of the skirt 70. And, the coupling element 538 at the second end 504 of the skirt 70 is received in the channel 428 of the winch mount 82. Once the skirt 70 is secured to the mounts 74, 78, 82. The winch 350 of the winch mount 82, specifically the shaft 384 of the winch 350, is rotated in a first direction to tighten skirt 70 to the desired or predetermined tension (e.g., between approximately 600 and 800 pounds). Accordingly, the skirt 70 is tensioned in a single direction (e.g., from the first end 40 of the frame 14 to the second end 44 of the frame 14). To remove the skirt 70, the winch 350 of the winch mount 82, specifically the shaft 384 of the winch 350, is rotated in a second direction opposite the first direction to loosen the skirt 70. The skirt 70 is removed in the reverse order as it was secured to the respective mounts 74, 78, 82.

It should be noted that in the embodiments in which the banner 586 is used (FIG. 20) tensioning the skirt 70 may also tension the banner. In some embodiments, not shown, the front mount 74 may also be configured as winch mount 82, such that the skirt 70 is tensioned in two directions (e.g., from the first end 40 of the frame 14 to the second end 44 of the frame 14 and from the second end 44 of the frame 14 to the first end 40 of the frame 14). Accordingly, the skirts 70, banners 386, or both are quickly installed (e.g., coupled to the vehicle 10). In some aspects, old or used skirt 70s and/or banners 386 are returned and/or swapped out, either in bulk or individually. Moreover, replacing the skirt 70s and/or banners 586 allows for the tracking device 550 and/or other electronics (e.g., lights, speed or impact sensors, etc.) to be replaced, recharged, etc.

In some embodiments, the winch 350 of the winch mount 82 may also change the position of graphical representation relative to the frame 14. That is, the skirt 70 may include a first advertisement and a second advertisement. The winch 350 may be used to alternatively position the first or second graphical representation such one or the other or both are visible.

The strength and position of support mounts 78 is at least partially determined by the material used, the desire predetermined tension of the skirt 70, and the length of the frame 14, among other characteristics. In the illustrated embodiment, there are three support mounts 78 and the support mounts 78 may each have a load capacity of 60 pounds, although the load capacity may vary. Also, in this embodiment, the support mounts 78 are evenly spaced along the trailer. In this embodiment, there are approximately 25 pounds of force on each of the supports. In other embodiments, additional or fewer support mounts 78 may be used based on one or more of the characteristics listed above. In still other embodiments, the support mounts 78 may unevenly spaced to support skirt 70 in more critical positions based on one or more of the characteristics listed above.

The first skirt assembly 26 may be coupled or mounted outboard or inboard of the frame 14. When the winch mount 82 of the first skirt assembly 26 is positioned forward of the second set of wheels 22, the winch mount 82 is positioned inboard of the frame 14. In this case, the coupling elements 534 are positioned in the second slot 338 of the support mounts 78. In contrast, when the winch mount 82 is positioned rearward of the second set of wheels 22, the winch mount 82 may be positioned inboard or outboard of the frame 14. When positioned outboard, the coupling elements 534 are positioned in the first slots 334 of the support mounts 18. Therefore, when positioned inboard, the first skirt assembly 26 (and the components there of) is closer to the ground than when the first skirt assembly 26 (and the components there of) is positioned outboard of the vehicle 10. The difference in height from the ground is about 1.75 inches. For example, when the first skirt assembly 26 (and the components there of) is installed outboard of the vehicle 10, it is 1.75 inches higher than when the first skirt assembly 26 (and the components there of) is installed inboard of the vehicle 10. As shown in FIG. 2, the winch mount 82 is installed inboard of the frame 14. In such case, the first bracket 380 of the winch mount 82 is positioned at the first end 130 of the first leg 120 of the body 100 and the coupling elements 534 along the top edge 508 of the skirt 70 are inserted in the first channels 334 of each of the support mounts 78. In other embodiments, the winch mount 82 may be installed outboard of the frame 14 by an outboard distance (e.g., 3 inches). This meets regulations and allows easy access to the product to replace/remove. In such case, first bracket 380 of the winch mount 82 is spaced apart from the first end 130 and the coupling elements 534 along the top edge 508 of the skirt 70 are inserted in the second channels 338 of each of the support mounts 78.

In some examples, the front mount 74 and the winch mount 82 are spaced apart by approximately 20 to 26 feet (e.g., 23 feet) along the frame 14. The winch mount 82 is coupled to the frame 14, for example, 16 ft from the second end 44 of the frame 14. The skirt 70 may be configured to withstand a maximum pressure of approximately 0.023 pounds per square inch ("psi") between the front mount 74 and the winch mount 82. In some embodiments, the skirt 70 may be configured to withstand a different maximum pressure between the front mount 74 and the winch mount 82 depending on the spacing therebetween and the spacing of the support mounts 78.

Although not shown, one or more of mounts 74, 78, 82 may include a bottom covering with a rubber or elastomeric material. The rubber covering helps prevent damage to respective mount 74, 78, 82, skirt 70, or other portions of the trailer assembly in a situation in which the mount 74, 78, 82 contacts the ground, a curb, etc. Moreover, the rubber covering helps to allow the mounts 74, 78, 82, and especially the second end 504 of the skirt 70, to extend lower and closer to the ground, which helps decrease air resistance, increase fuel economy, etc.

Figure 5:
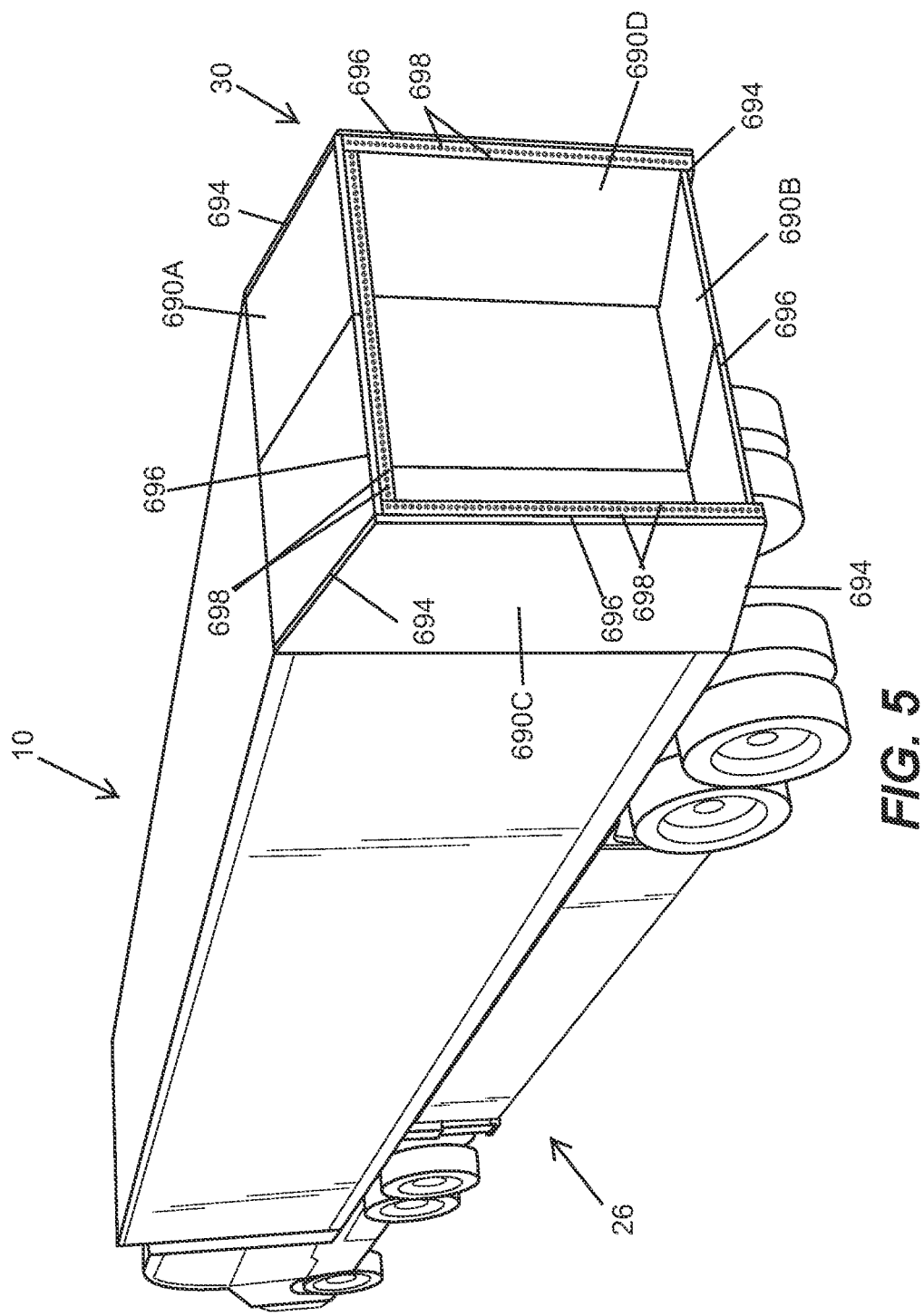
FIG. 5 illustrates a perspective view of the vehicle of FIG. 1A including fairings.

With renewed reference to FIG. 5, the fairings 30 are coupled to a rear face of the vehicle 10 and are movable between a retracted position (not shown) and an extended position. In the illustrated embodiment, a first fairing 690A extend from the top of the rear face of the vehicle 10, a second fairing 690B extend from the bottom of the rear face of the vehicle 10, a third fairing 690C extend from a first side of the rear face of the vehicle 10, and a fourth fairing 690D extend from a second side of the rear face of the vehicle 10. In the illustrated embodiment, the fairings 690A-690D are formed of the same material as the skirt. In the retracted configuration, the fairings 690A-690D are positioned adjacent the rear face of the vehicle to allow access to a rear door of vehicle 10. FIG. 5 illustrates the fairings 690A-690D in the extended position. In the extended position, the fairings 690A-690D are held in place and tensioned by a metal frame 696 using one or more telescoping arms 694 and one or more end posts 696 at the rear portion of fairing 690. In the extended position, as shown in FIG. 5, the fairings 690A-690D help to reduce the drag. The fairings 690A-690D are extendable and retractable with a manual mechanism (e.g., a hand crank, not shown) or electrically powered mechanism (not shown).

Additionally, as shown in FIG. 5, the fairings 690A-690D include one or more pumps or fans 698. For example, the first fairing 690A, second fairing 690C, and fourth fairing 690D each include a plurality of fans 698. Although not shown, bottom fairing 690B also includes a plurality of fans 698. The fans 698 are arranged in one or more bands or rows. Fans 698 redirect and/or accelerate air passing over, around, and/or through portions of vehicle.

The fans 698 are coupled to the rear ends of the fairings 690A-690D. For example, the fans 698 are coupled to an inward side (toward the middle of frame 14) on the rear ends of fairings 690A-690D. Alternatively, fans 698 may be positioned at middle portions of the fairings 690A-690D. In this aspect, although not shown, the fairings 690A-690D may include internal ducts or air passages that may be coupled to one or more openings on the vehicle 10, such that air may pass from the one or more openings, may pass through the internal ducts or air passages, and may be directed and/or accelerated by fans 698. For example, details of one or more openings and/or ducts or air passages in a trailer assembly are described in commonly assigned U.S. Pat. No. 10,093,363 (U.S. application Ser. No. 15/652,086), which is incorporated by reference in its entirety herein.

As mentioned above, the fans 698 help to accelerate and/or direct air over and/or through vehicle 10. The fans 698 aid in reducing drag, which helps to improve fuel efficiency of vehicle 10. The fans 698 direct and/or accelerate air toward the rear of the vehicle 10 or straight back behind vehicle 10, which helps vehicle 10 move more efficiently through the air. Furthermore, the fans 698 are angled, for example, via the angle of the fairings 690A-690D, to direct air toward the center of the rear of the vehicle 10, that is, with the fans 698 on top fairing 690A directed downward, with fans 698 on side fairings 690C and 690D directed inward, and, optionally, with the fans (not shown) on bottom fairing 690B directed upward. The fans 698 direct air in an at least partially cone-like shape, which helps vehicle 10 move more efficiently through the air. Additionally, deactivating the fans 698 aids in braking and/or assist vehicle 10 to slow down by increasing the pressure drag on vehicle 10.

Figure 4:
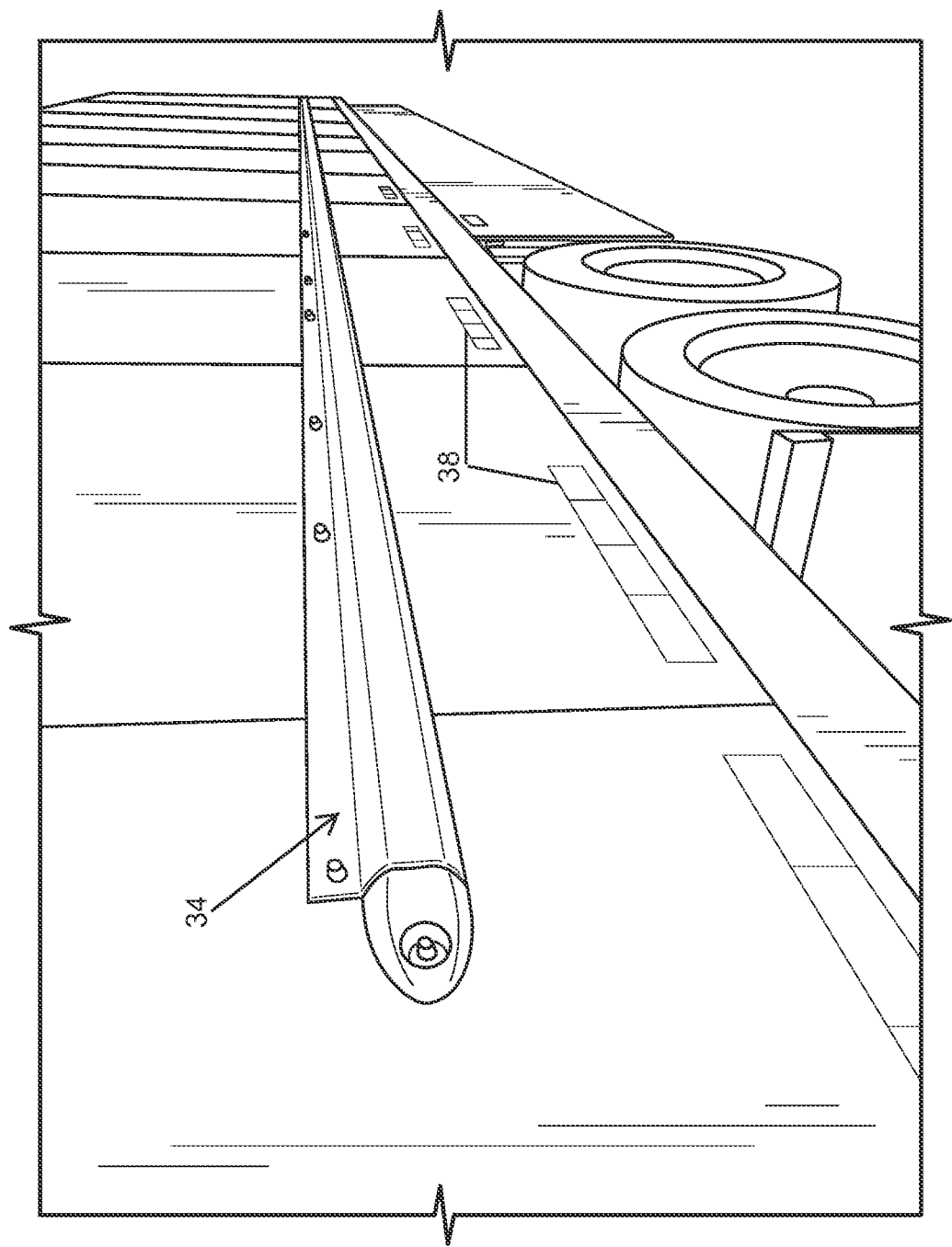
FIG. 4 illustrates a perspective view of the vehicle of FIG. 1A including a protective element.

As shown in FIG. 4, the protective element 34 is coupled to one or both sides of the vehicle 10 (e.g., trailer or box). The protective element 34 is a rub rail, for example, formed of a metallic or elastomeric material, that helps protect vehicle 10. For example, protective element 34 helps protect trailer 1202 from a wall, garage door, other trailer, etc. as vehicle 10 is being maneuvered in tight areas. Protective element 34 is coupled to the vehicle via any appropriate coupling mechanism, for example, one or more of bolts, screws, an adhesive, etc.

The protective element 34 extends along the entire length of one or both sides of vehicle 10, or the protective element 34 may extend along a portion of the length of one or both sides of vehicle 10. For example, the protective element 34 may extend along the same portion of vehicle 10 as the skirt. In this aspect, the protective element 34 helps to protect the skirt and other elements of the first skirt assembly 26.

In some embodiments, the protective element 34 has a thickness of approximately 2.5 to 3.5 inches. In one aspect, the protective element 34 has a width of approximately 3 inches. Furthermore, the protective element 34 may change in size (e.g., thickness) along the length, or a portion of the length, of the side of vehicle 10. For example, one or more portions of the protective element 34 may be approximately 1.5 inches in thickness, and one or more portions of the protective element 34 may be approximately 3 inches in thickness. In one aspect, the one or more portions of the protective element 34 that are approximately 3 inches in thickness correspond to (e.g., at least partially overlap with or align with, either above or below) one or more portions of an aerodynamic device or system that is also coupled to trailer. In this aspect, the protective element 34 are approximately 3 inches in thickness where it overlaps (or aligns with) the first skirt assembly 26 such that the protective elements extend beyond the first skirt assembly 26.

The protective element 34 helps to protect both vehicle 10 and one or more elements of the first skirt assembly 26. Additionally, the protective element 34 is coupled and uncoupled from vehicle 10. For example, the protective element 34 is coupled to or retrofit to an existing vehicle 10 having one or more skirt assemblies, and the protective element 34 is uncoupled from vehicle 10 if and when one or more skirt assemblies 26 are removed from vehicle 10.

FIGS. 21-22 illustrate other embodiments of the vehicle 10 in which at least a portion of the skirt assemblies 26 (only one of which is shown) extend past and at least partially cover the second set of wheels 22. The embodiments shown in FIGS. 21-22 are similar to that shown in FIGS. 1-13, therefore only the differences between the embodiments will be discussed. Although not explicitly shown, it should be understood that all of the features that were described relative to the embodiment of FIGS. 1-13 may apply to the embodiments of FIGS. 21-22.

In the first skirt assembly 26 of embodiments of FIGS. 21-22, the skirt 70 has a first skirt portion 70a and a second skirt portion 70b, the winch mount 82 is a double winch mount 82 (e.g., a double tensioning mount or a double tensioning device that includes two winches 350a, 350b or rotatable shafts 384a, 384b), and a rear mount 900 is positioned at or adjacent to the rear end of the vehicle 10. As shown, the first skirt portion 70a extends from the front mount 74 to the winch mount 82 and the second skirt portion 70b extends from the winch mount 82 to the rear mount 900. In the embodiments of FIGS. 21 and 22, the winch mount 82 is positioned in front of the second set of wheels 22, but in other embodiments, the winch mount 82 may be positioned in-line with the second set of wheels 22 or behind the second set of wheels 22. The first skirt portion 70a has the same structure and features as the skirt 70 of embodiments of FIGS. 1-13 and therefore like structure is identified with like reference numerals. In the illustrated embodiments, the second skirt portion 70b includes similar features discussed above with respect to the skirt 70 of embodiments 1-13 and therefore like structure is identified with like reference numerals only the differences will be discussed. Whereas the height of the first skirt portion 70a is constant along the length of the first skirt portion 70a between the top edge 508a and the bottom edge 512a, the height of the second skirt portion 70b varies along the length of the second skirt portion 70b between the top edge 508b and the bottom edge 512b. As shown herein, the first end 500b of the second skirt portion 70b is the same height as the second end 504a of the first skirt portion 70a. Also, the height of the second end 504b of the second skirt portion 70b is shorter than the height of the first end 500b of the first and second skirt portions 70a, 70b. Each of the first and second skirt portions 70a, 70b may include a graphical representation. The alternative features discussed above with respect to the skirt 70 of the embodiments of FIGS. 1-13 apply to the first skirt portion 70a and the second skirt portion of the embodiments of FIGS. 21-22.

Figure 25:
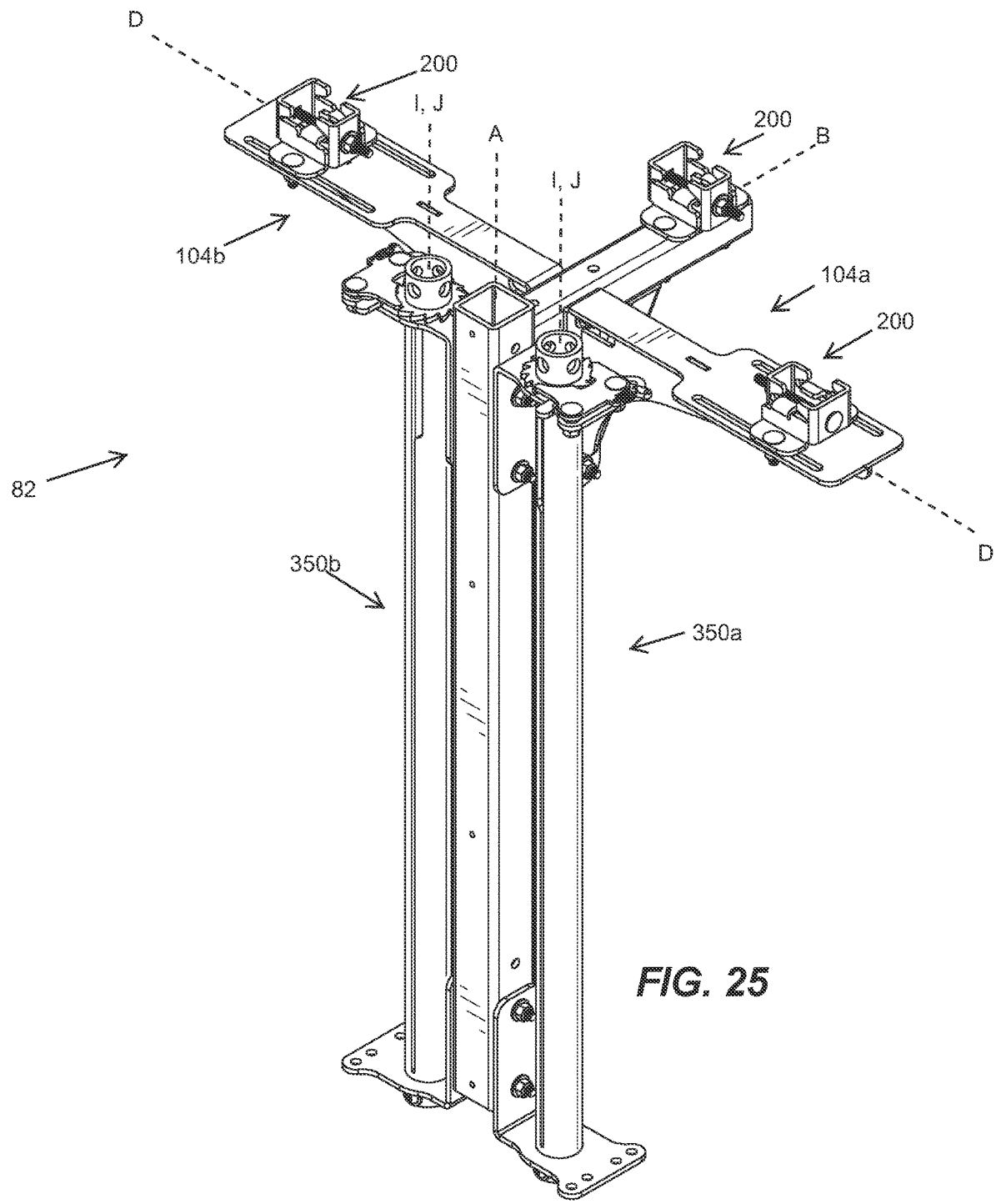
FIG. 25 illustrates a perspective view of a tensioning mount of the skirt assembly of FIGS. 21 and 22.
Figure 26:
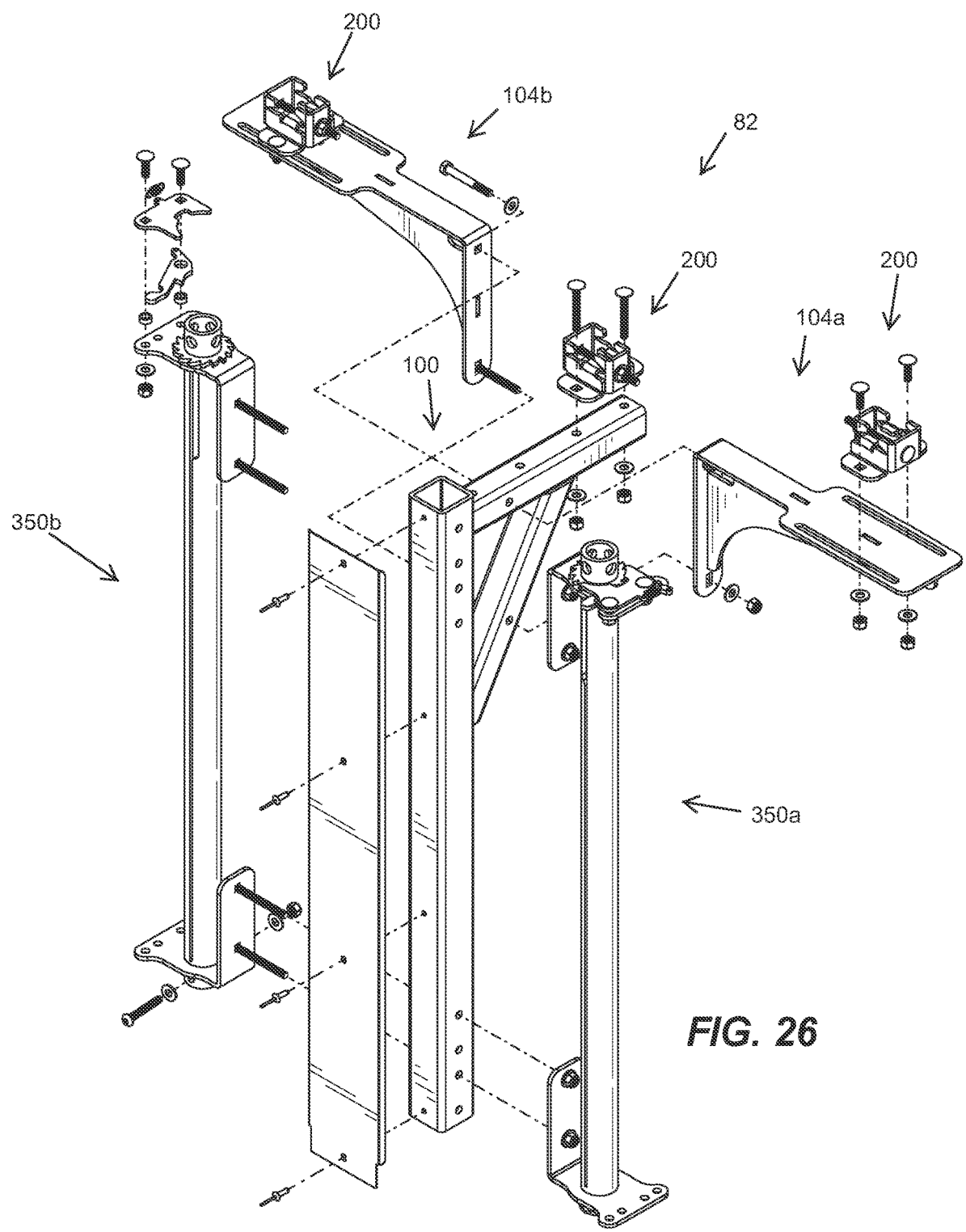
FIG. 26 illustrates an exploded view of a tensioning mount of FIG. 25.

As shown in FIGS. 21, 22, and 25, the winch 350 of the winch mount 82 includes a first winch 350a and the bracket 104 is the first bracket 104a, and the winch mount 82 further includes a second winch 350b and a second bracket 104b. The first winch 350a and the second winch 350b are coupled to opposite sides 132, 134 of the first leg 120 of the body 100 of the mount 82. Similarly, the first bracket 104a and the second bracket 104b are coupled on opposite sides of the body 100 of the mount 82 also. The first winch 350a has the same features as the winch 350 of FIGS. 1-13 and the second winch 350b has the same features as the first winch 350a. Therefore, like reference numerals are used for like structure. As shown, the teeth 432a of the second winch 350a are oriented in an opposite direction as the teeth 432b of the second winch 350b. The first bracket 104a has the same features as the bracket 104 of FIGS. 11-13 and the second bracket 104b has the same features as the first bracket 104b. Therefore, like reference numerals are used for like structure.

In the embodiment of FIG. 21, the rear mount 900 is spaced apart from the second end 44 of the frame 14 and between the second end 44 of the frame 14 and the second set of wheels 22. Accordingly, the second portion 70b of the skirt extends from the second winch 350b of the winch mount 82 to the rear mount 900 thereby covering at least a portion of the second set of wheels 22. The rear mount 900 has the similar features as the front mount 74 (of FIGS. 6-7) and therefore like reference numerals are used for like structure. In some embodiments, a support mount 78 may be coupled to the frame 14 between the winch mount 82 and the rear mount 900.

Figure 24:
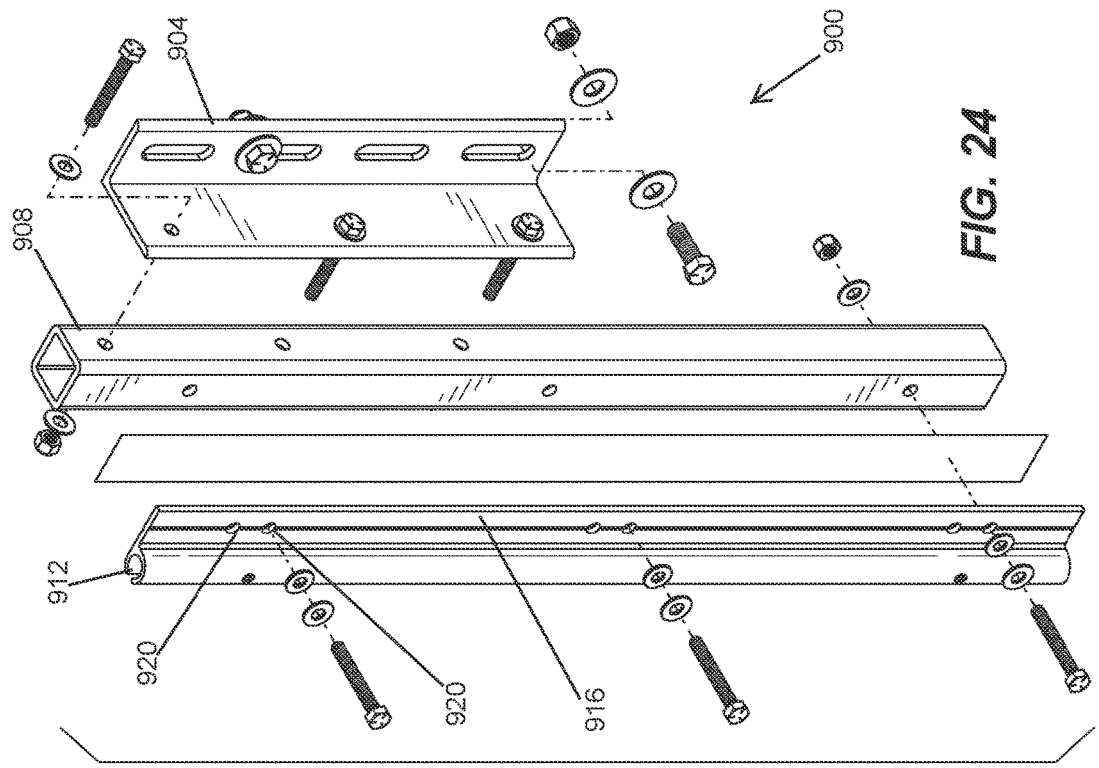
FIG. 24 illustrates an exploded view of the rear mount of the skirt assembly of FIG. 22.
Figure 23:
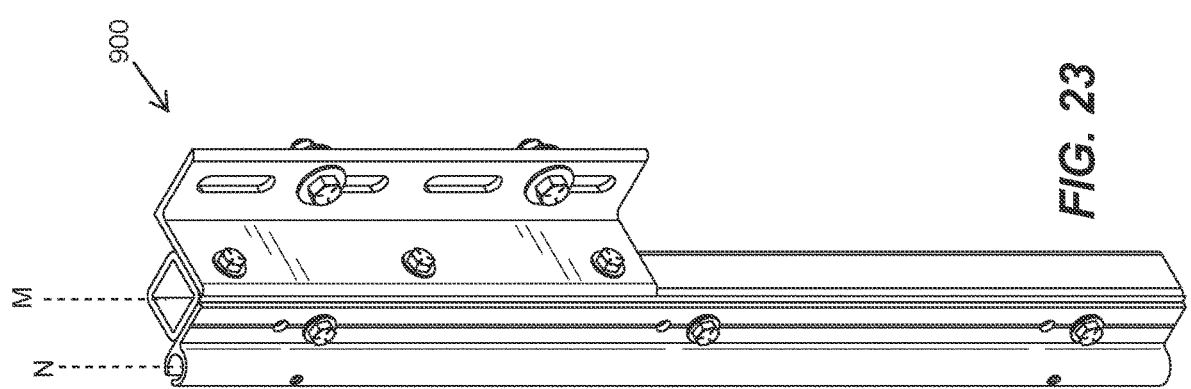
FIG. 23 illustrates a perspective view of a rear mount of the skirt assembly of FIG. 22.

In the embodiment of FIG. 22, the rear mount 900 (shown in detail in FIGS. 23-24) is positioned at and coupled to the second end 44 of the frame 14. That is, the rear mount 900 is coupled to (e.g., fastened to, bolted to) a rear bumper 904 or a bracket 908 coupled to the rear bumper 904 of the vehicle 10. In the illustrated embodiment, the rear mount 900 is coupled to the bracket 904, which is coupled to the rear bumper 908. The rear bumper defines an axis M, which is oriented parallel to the longitudinal axis Z of the frame 14. In the illustrated embodiment, the rear mount 900, like the front mounts 78 of FIGS. 1-13, includes a channel or rail 912 extending from a mounting portion 916, which has a plurality of apertures 920. The channel 912 defines an axis N. The mounting portion 916 is coupled to the rear bumper 904 or bracket 908 by fasteners (e.g., screws, pins, etc.). Specifically, the apertures 920 of the mounting portion 916 are aligned with respective apertures of the rear bumper 904. A fastener extends through each of the aligned apertures 920 to couple the mounting portion 916 to the rear bumper 904. In the illustrated embodiment, a length of the channel 912 is the same length or a shorter length than a length defined by the winch mount 82. In the illustrated embodiment, the lengths of the channel 912 are shorter than the length defined by the winch mount 82. This is to accommodate the varying height of the second skirt portion 70b, which provides more clearance for the second skirt portion 70b (e.g., when the vehicle 10 is backing up a ramp or is close to a curb). The second skirt portion 70b extends from the second winch 350b of the winch mount 82 to the rear mount 900 thereby covering at least a portion of the second set of wheels 22. The channel 912 attached to the rear bumper 904 enables the skirt 70a, 70b to extend up to an additional 12-20 inches further than the location shown in FIG. 1A. In some embodiments, a support mount 78 may be coupled to the frame 14 between the winch mount 82 and the rear mount 900.

As noted with respect to FIGS. 1-13, although not shown, like the one or more of front mount 74, winch mount 82, or support mounts 78, the rear mount 900 may include a bottom covering with a rubber or elastomeric material. For example, a bottom portion of rear mount 900 includes a rubber covering. The rubber covering helps prevent damage to rear mount 900, skirt 70, or other portions of the trailer assembly in a situation in which rear mount 900 contacts the ground, a curb, etc. Moreover, the rubber covering helps to allow the rear mount 900, and thus second end of the second skirt portion 70b, to extend lower and closer to the ground, which decreases air resistance, increase fuel economy, etc.

The first skirt assembly 26 of FIGS. 21-22 is coupled to the frame 14 of the vehicle 10 in a similar manner as the first skirt assembly 26 of FIGS. 1-13. The first skirt portion 70a is coupled to the frame 14 as the skirt 70 is coupled to the frame, discussed above relative FIGS. 1-13, and the second skirt portion 70b is coupled to the frame 14 in a similar manner as the first skirt portion 70a. Therefore, only the differences will be discussed.

The rear mount 900 is coupled (via the clamps 200) to the frame 14 at or adjacent the second end 44 (e.g., between the winch mount 82 and the second end 44 of the frame 14). The support mount 78 is coupled (via the clamps 831) to the frame 14 between the winch mount 82 and the rear mount 900. The channels 112, 912 of the rear mounts 900 extend vertically relative to the frame 14 such that the longitudinal axis M thereof are substantially perpendicular to the longitudinal axis Z of the frame 14. In other embodiments, the mounts 82, 900 may be aligned in a straight line that is substantially parallel to the longitudinal axis Z of the frame 14. Alternatively, the mounts 78, 82, 900 may form a gradual arc (as discussed above) along the length of the frame 14 and are therefore a tangent of the arc may oriented generally at an angle relative to the longitudinal axis Z of the frame 14.

Once the mounts 78, 82, 900 are appropriately positioned, the second end 504*b* of the second skirt portion 70*b* is be secured to the rear mount 900, the second skirt portion 70*b* is secured to the support mount 78, and the first end 500*b* of the second skirt portion 70*b* is secured to the second winch 350*b* of the winch mount 82. Specifically, the coupling element 538*b* at the second end 504*b* of the second skirt portion 70*b* is received in the channel 912 of the rear mount 900. The coupling elements 534*b* adjacent the top edge 508*b* of the second skirt portion 70*b* are then positioned in one of the slots 334, 338 of each of the support mounts 78. The same channel (either the first channel 334 or the second channel 338) of each support mount 78 should receive the respective coupling element 534*b* of the second skirt portion 70*b*.

The coupling element 530*b* at the first end 500*b* of the second skirt portion 70*b* is received in the channel 428*b* of the second winch 350*b* of the winch mount 82. Once the skirt 70 is secured to the mounts 78, 82, 900, he second winch 350*b* of the winch mount 82, specifically the shaft 384 of the second winch 350*b*, is rotated in a first direction to tighten the second skirt portion 70*b* to the desired or predetermined tension (e.g., between approximately 600 and 800 pounds). Accordingly, the skirt 70 may be tensioned in a single direction (e.g., from the first end 40 of the frame 14 to the second end 44 of the frame 14). To remove the second skirt portion 70*b*, the second winch 350*b* of the winch mount 82, specifically the shaft 384*b* of the second winch 350*b*, is rotated in a second direction opposite the first direction to loosen the second skirt portion 70*b*. The second skirt portion 70*b* may be removed in the reverse order as it was secured to the respective mounts 78, 82, 900.

In some examples, the front mount 74 and the winch mount 82 are spaced apart by approximately 20 feet to 26 feet (e.g., 23 feet) along the frame 14. The rear mount 900 and the winch mount 82 are spaced apart by approximately 13 feet to 19 feet (e.g., 16 feet) along the frame 14. Accordingly, skirt 70*a*, 70*b* may span approximately 33 feet to 45 feet (e.g., 39 feet) along the frame 14. The winch mount 82 is coupled to the frame 14 approximately 16 feet, for example, from the second end 44 of the frame 14. In some embodiments, the first skirt portion 70*a* may be configured to withstand a maximum pressure of approximately 0.023 pounds per square inch ("psi") between the front mount 74 and the winch mount 82. In some embodiments, the first skirt portion 70*a* may be configured to withstand a different maximum pressure between the front mount 74 and the winch mount 82 depending on the spacing therebetween and the spacing of the support mounts 78. Furthermore, in some embodiments, the second skirt portion 70*b* may be configured to withstand a maximum pressure of approximately 0.021 psi between the winch mount 82 and the rear mount 900. In some embodiments, the second skirt portion 70*b* may be configured to withstand a different maximum pressure between the winch mount 82 and the rear mount 900 depending on the spacing therebetween and the spacing of the support mounts 78.

In some embodiments, the second winch 350*b* of the winch mount 82 may also change the position of graphical representation relative to the frame 14. That is, the second skirt portion 70*b* may include a first advertisement and a second advertisement. The second winch 350*b* may be used to alternatively position the first or second graphical representation such one or the other or both are visible. Moreover, the double winch mount 82 (and the first and second winches 350*a*, 350*b* thereof) may allow for the respective first and second skirt portions 70*a*, 70*b* to be opened or retracted individually, for example, from a front, middle, or back portion of the skirt 70*a*, 70*b*. Moreover, like the first skirt portion 70*a*, the second skirt portion 70*b* may be coupled or mounted outboard or inboard of the frame 14, similar to that discussed above. Whether the winch mount 82 of the first skirt assembly 26 of FIGS. 21 and 22 is positioned forward or rearward of the second set of wheels 22, the winch mount 82 may be positioned inboard or outboard of the frame 14. When positioned outboard, the coupling elements 534 are positioned in the first slots 334 of support mounts 78. In the illustrated embodiment, the first skirt assembly 26 (and the components there of) of FIGS. 21 and 22 are positioned outboard of the vehicle 10 and higher from the ground than when the winch mount 82 of FIG. 1A (discussed above) is positioned inboard. Again, the difference in height is about 1.75 inches.

As noted above, in some examples, one or more tracking device(s) 550 (FIG. 28) may be coupled to and/or associated with the graphical representation in order to track the location of the graphical representation. The tracking device 550 is equipped with global positioning system (GPS) technology or other suitable positioning technology. In some examples, if the graphical representation is printed directly on the skirt 70, 70*a*, 70*b*, the GPS tracking device(s) 550 may be coupled to, embedded within, etc. the skirt 70, 70*a*, 70*b*. In another example, as shown in FIG. 20, if the graphical representation is printed on a banner 586, the GPS tracking device(s) 550 may be coupled to, embedded within, etc. the banner 586, for example, in a corner of the banner 586. In another example, the GPS tracking device(s) 550 are coupled to a vehicle 10 at a location separate from the graphical representation, such as the frame 14 or the cargo portion. However, the GPS tracking device(s) 550 may be associated with the graphical representation. The GPS tracking device(s) 550, the graphical representation, and the vehicle 10 may be associated with each other by scanning a bar code or QR code situated on each using a mobile application. In these examples, the owner, operator, etc. may track the location, distance traveled, duration of travel, etc. of one or more graphical representations.

Figure 27:
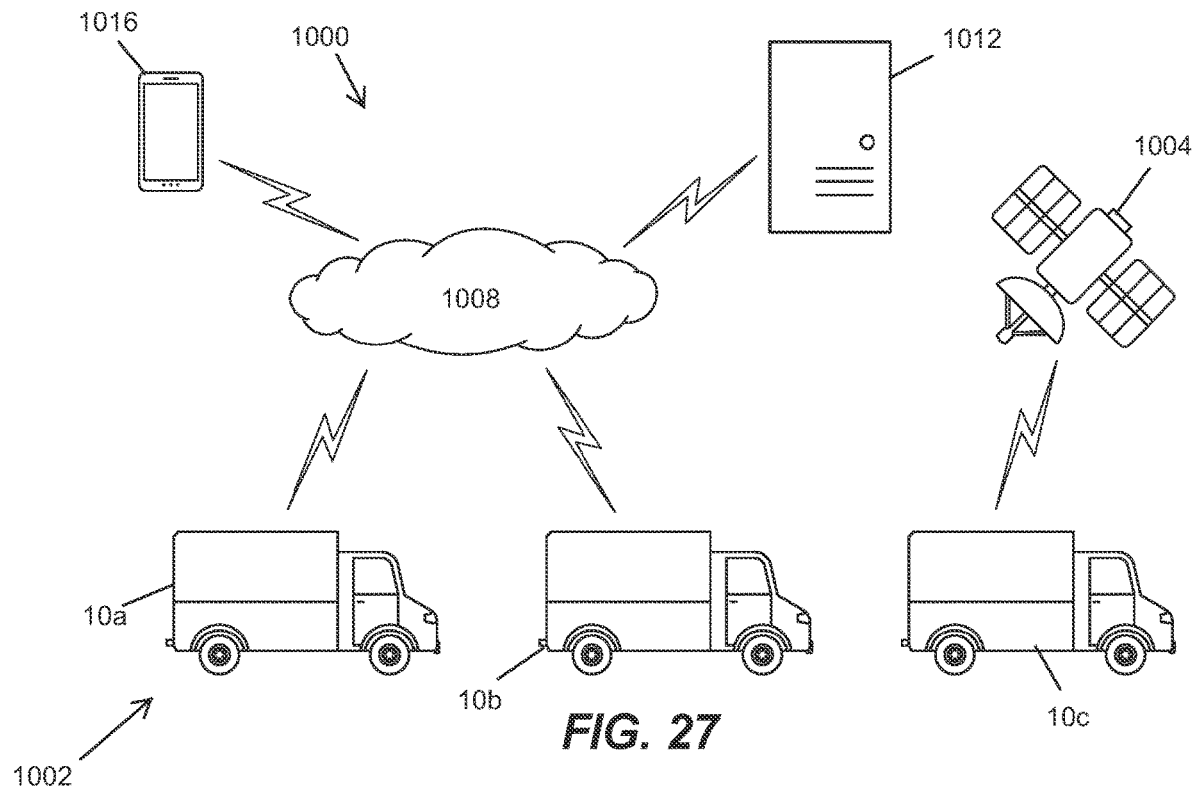
FIG. 27 is a schematic diagram of a system of tracking a graphical representation of the skirt assembly of FIGS. 1A, 1B, 21, and 22, according to some embodiments.

FIG. 27 provides a tracking system 1000 of the one or more graphical representations. The tracking system 1000 includes one or more vehicle(s) 10, such as first vehicle 10*a*, second vehicle 10*b*, and third vehicle 10*c*, which together form a fleet 1002. Each vehicle 10 may include a skirt 70, 70*a*, 70*b* with one or more GPS tracking device(s) 550 coupled to each skirt 70, 70*a*, 70*b*. In other embodiments, the one or more GPS tracking device(s) 550 are coupled to the respective vehicle 10 separately from the skirt 70, 70*a*, 70*b*. Additionally, each skirt 70, 70*a*, 70*b* may have a graphical representation printed on the skirt 70, 70*a*, 70*b* in a manner described above. In some embodiments, each vehicle 10 has a unique graphical representation not shared with another vehicle 10 within the fleet 1002. Alternatively, each vehicle 10 may have the same graphical representation as the other vehicles 10 within the fleet 1002. In some embodiments, some vehicles 10 may share graphical representations within the fleet 1002, while other vehicles 10 have a different graphical representation within the fleet 1002. For example, the first vehicle 10a and the second vehicle 10b have a first graphical representation, while the third vehicle 10c has a second graphical representation. The graphical representation of each vehicle 10 may be associated with the GPS tracking device(s) 550 of each vehicle 10.

The one or more GPS tracking device(s) 550 may communicate with a GPS satellite 1004. The GPS satellite 1004 provides the one or more GPS tracking device(s) 550 with information regarding the time and location (e.g., position) of the respective GPS tracking device 550 (and by extension, the corresponding vehicle 10 and graphical representation). The GPS satellite 1004 may further include a GPS server (not shown) which stores location information of devices communicatively coupled to the GPS satellite 1004. The one or more GPS tracking device(s) 550 associated with the skirt 70, 70a, 70b of each vehicle 10 in the fleet 1002 may transmit position data (e.g., position information, movement data, movement information, etc.) to a remote server 1008 via an internet and/or a cellular network (hereinafter "network") 1012. The tracking system 1000 may further include a mobile device 1016 configured to communicate with the network 1012 and/or the server 1008, as described in more detail below.

Figure 28:
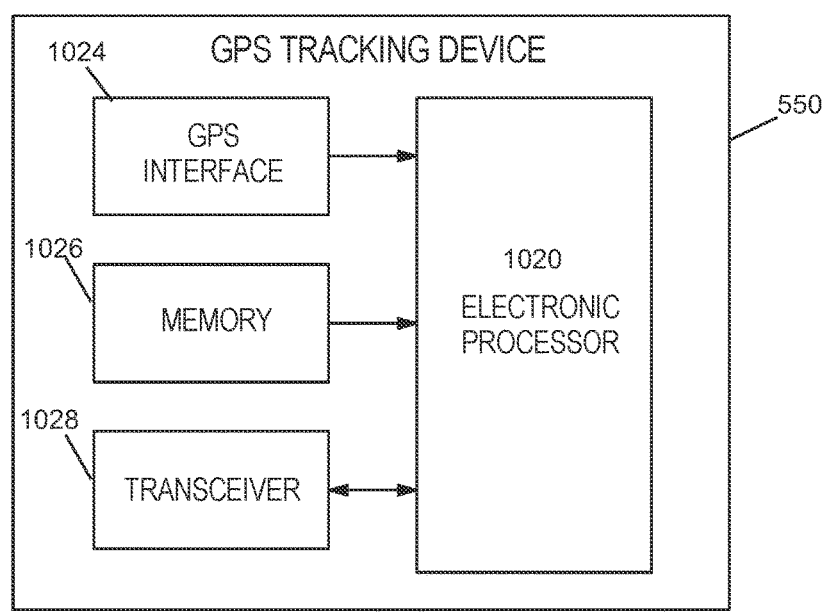
FIG. 28 is a block diagram of a global positioning system tracking device that is useable with the vehicle of FIGS. 1A, 1B, 21, and 22, according to some embodiments.

FIG. 28 illustrates an example GPS tracking device 550 in a block diagram format. The GPS tracking device 550 includes a first electronic processor 1020 (e.g., an electronic controller, a programmable microprocessor, a microcontroller, or other suitable device), a GPS interface 1024, a first memory 1026, and a transceiver 1028. The first electronic processor 1020 is configured to receive instructions and data from the first memory 1026 and execute, among other things, instructions related to operation of the GPS tracking device 550. In particular, the first electronic processor 1020 executes instructions stored in the first memory 1026 to perform the methods described herein. The first memory 1026 includes read only memory (ROM), random access memory (RAM), other non-transitory computer-readable media, or a combination thereof. In some embodiments, the first memory 1026 stores a history (e.g., a log) of positions of the GPS tracking device 550 as the associated vehicle 10 and graphical representation move about.

The GPS interface 1024 communicates with the GPS satellite 1026 to receive information regarding the position of the GPS tracking device 550. In some embodiments, the position information includes, among other things, a time stamp, a ping rate, a vehicle speed, a latitude, a longitude, a zip code, and a distance traveled. Communication between the GPS tracking device 550 and the GPS satellite 1004 may occur via an application programming interface (API) stored within the first memory 1026 that accesses data from the GPS satellite 1004 in real time. The GPS interface 1024 may request the position data at a predetermined time interval (for example, once every 5 seconds, once every minute, etc.). The transceiver 1028 provides the GPS tracking device 550 with bidirectional communication with the server 1008 (through the network 1012). In some embodiments, the GPS tracking device 550 transmits its own position information to the server 1008 via the transceiver 1028 as soon as the position information is received by the GPS interface 1024. In other embodiments, the GPS tracking device 550 transmits position information to the server 1008 at a second predetermined time interval (for example, once every 5 seconds, once every minute, etc.).

Figure 29:
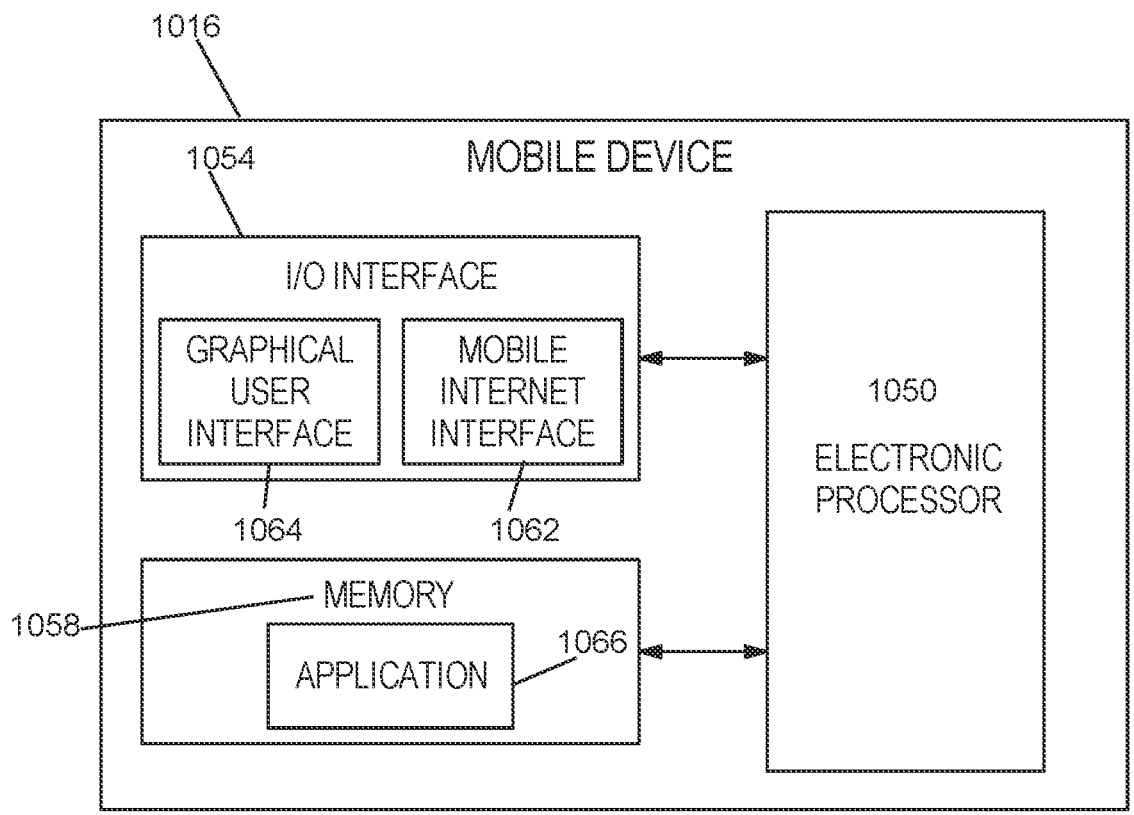
FIG. 29 is a block diagram of a mobile device, according to some embodiments.

In some embodiments, as further described below, position information regarding the GPS tracking device 550 and graphical representation are accessible using an external device. For example, FIG. 29 provides a block diagram of a mobile device 1016. The mobile device 1016 may be, for example, a cellular device, a personal tablet, a personal computer, or the like. The mobile device 1016 includes a second electronic processor 1050 (e.g., an electronic controller, a programmable microprocessor, a microcontroller, or other additional suitable device), an input/output (I/O) interface 1054, and a second memory 1058. The second electronic processor 1050 is configured to receive instructions and data from the second memory 1058 and execute, among other things, instructions related to operation of the mobile device 1016. In particular, the second electronic processor 1050 executes instructions stored in the second memory 1058 to perform the methods described herein. The second electronic processor 1050 may work in conjunction with the first electronic processor 1020 to perform such methods.

The input/output interface 1054 provides a communication link between the second electronic processor 1050 and other components of the tracking system 1000, such as, but not limited to, the network 1012 and the server 1008. For example, the input/output interface 1054 may include a mobile internet interface 1062 that allows the electronic processor 1050 to communicate with the network 1012. The input/output interface 1054 may also include a graphical user interface 1064. The graphical user interface 1064 provides information related to the position of the GPS tracking device 550. The second electronic processor 1050 may also receive user inputs via the graphical user interface 1064. For example, a user of the mobile device 1016 may select options related to the position information, such as selecting different report options, described in more detail below.

The second memory 1058 includes read only memory (ROM), random access memory (RAM), other non-transitory computer-readable media, or a combination thereof. The second memory 1058 may include an application 1066 that allows a user of the mobile device 1016 to generate reports based on the position of the graphical representation. The user of the mobile device 1016 may access the application 1066 via the graphical user interface 1064.

Figure 30:
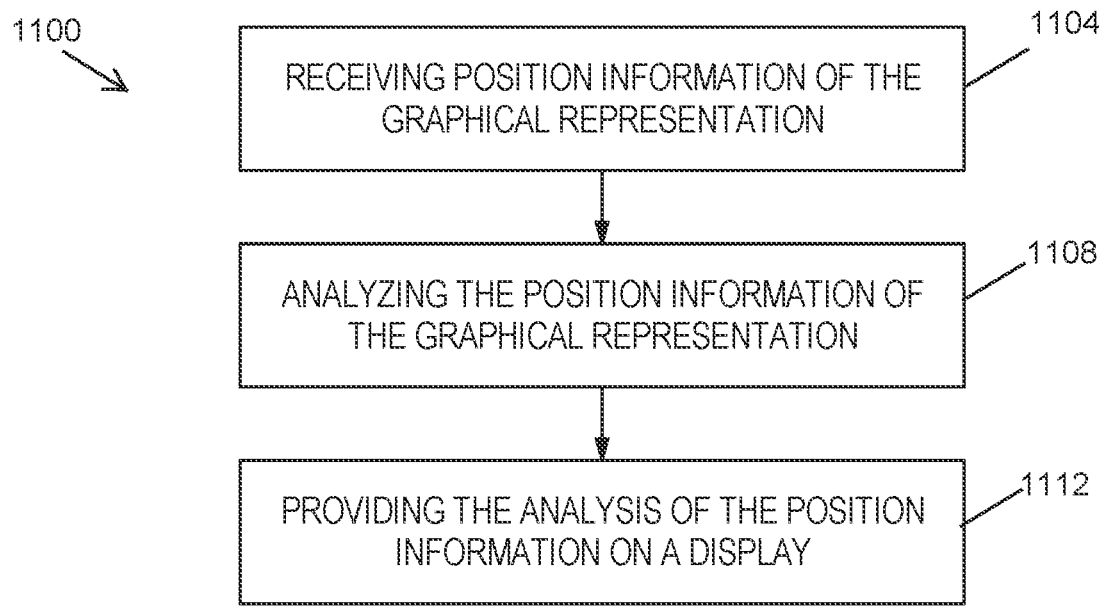
FIG. 30 is a flow chart of one embodiment of a method of tracking a graphical representation of the skirt assembly of FIGS. 1A, 1B, 21, and 22.

As previously stated, one or more GPS tracking system(s) 550 may be coupled to and/or associated with the graphical representation in order to track the location of the graphical representation. FIG. 30 provides a method 1100 for tracking the location of the graphical representation. Method 1100 may be performed by the first electronic processor 1020, the second electronic processor 1050, or a combination thereof. At block 1104, the method 1100 includes receiving a position information of the graphical representation. For example, the electronic processor 1020 of the GPS tracking device 550 may receive the position (e.g., position information) of the GPS tracking device 550 (and therefore the graphical representation) via the GPS interface 1024 communicating with the GPS satellite 1004. In some embodiments, the server 1008 receives the position information from the GPS tracking device 550. For example, the GPS tracking device 550 receives the position information from the GPS satellite 1004. The GPS tracking device 550 transmits, with the transceiver 1028, the position information to the server 1008.

At block 1108, the method 1100 includes analyzing the position information of the graphical representation. For example, the server 1008, the first electronic processor 1020, and/or the second electronic processor 1050 may determine how the position of the GPS tracking system 550 changes over time in order to track movement of the graphical representation. This may include determining the speed of the graphical representation, the distance of the graphical representation, and the like. In some embodiments, the number of graphical representations experiencing movement is determined. A prediction of the total number of vehicles the graphical representation has passed may be determined. In some embodiments, the number of graphical representations per region of land (for example, per state, country, etc.) is determined. The total diesel and emissions data for the graphical representation, based on the speed and distance information, may be determined.

In some embodiments, a number of impressions is determined based on the location, the speed, and the proximity of the graphical representation to cell phones in the area. For example, the location of the graphical representation and the location of cellular devices are determined by the GPS satellite 1004. The distance between the graphical representation and the location of the cellular devices is used to determine whether the graphical representation may have been viewed by someone driving past the corresponding vehicle 10.

At block 1112, the method 1100 includes providing the analysis of the position information on a display. For example, the analysis of the position information may be provided on a display of the mobile device 1016 via the graphical user interface 1064. In some embodiments, the analysis of the position information is provided upon accessing the application 1066.

Figure 31:
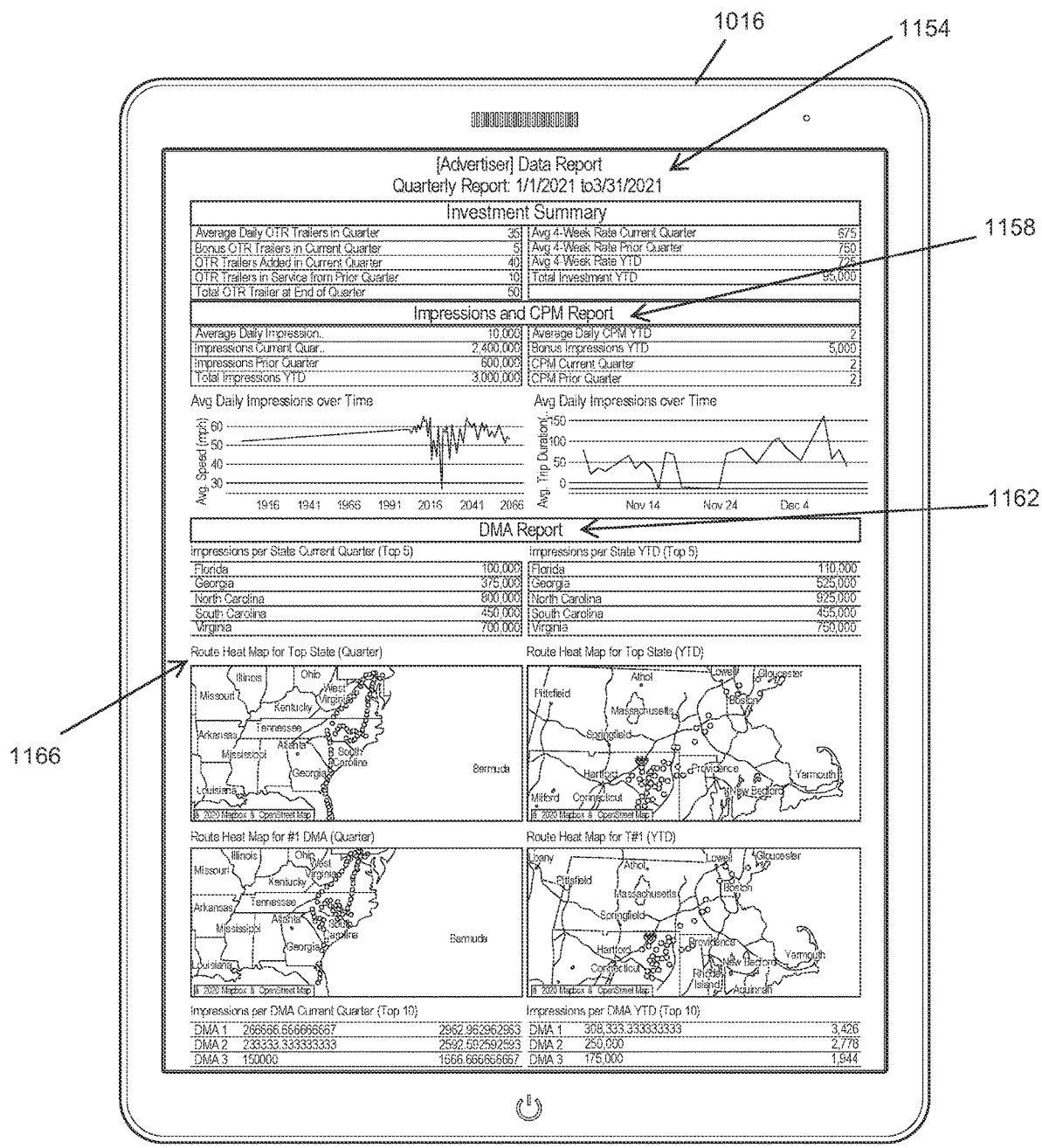
FIG. 31 illustrates the mobile device of FIG. 29 displaying a tracking report according to some embodiments.

The analysis of the position information may be provided via a report generated within the application 1066. FIG. 31 illustrates the mobile device 1016 providing a location report 1150 according to some embodiments. The location report 1150 may be unique to a specific graphical representation or a plurality of graphical representations. Accordingly, the location report 1150 may combine position information received from a plurality of GPS tracking devices 550 that are associated with the respective graphical representation being observed. The location report 1150 may include, among other things, an investment summary 1154, and impressions and cost-per-thousand (CPM) report 1158, a designated marked area (DMA) report 1162, and a plurality of position maps 1166. The investment summary 1154 may include, among other things, an average daily amount of vehicles 10 including the corresponding graphical representation, a number of vehicles 10 that have obtained the corresponding graphical representation in a quarter, the total number of vehicles 10 that have traveled with the corresponding graphical representation at any point, and a total amount of financial investment for a quarter related to the corresponding graphical representation.

The impressions and CPM report 1158 may include, among other things, a predicted average number of impressions (e.g., predicted number of vehicles or people who have seen the corresponding graphical representation based on movement of the graphical representation, as described above), a predicted number of impressions in a quarter, an average daily CPM, and the like. The DMA report 1162 may include, among other things, a list of impressions per state in a given quarter or year. Additionally, travel of the corresponding graphical representation may be presented in the plurality of position maps 1166. The plurality of position maps 1166 may show the current location of each GPS tracking device 550 associated with the corresponding graphical representation.

Various features and advantages of the invention are set forth in the following claims.

What is claimed is:

1. A vehicle system comprising:
a vehicle;
a server configured to store position information;
a skirt coupled to the vehicle, the skirt including a graphical representation; and
a global positioning system (GPS) tracking device coupled to the vehicle and associated with the graphical representation, the GPS tracking device wirelessly coupled to the server, the GPS tracking device including an electronic processor and a memory, the electronic processor configured to:
receive, via a GPS interface, a position of the graphical representation; and
transmit, via a transceiver, the position of the graphical representation to the server,
wherein the position of the graphical representation is accessible via an application on a mobile device.

2. The vehicle system of claim 1, wherein the server is configured to store position information associated with a plurality of graphical representations.

3. The vehicle system of claim 1, wherein the vehicle is a first vehicle of a fleet of vehicles, and wherein each vehicle of the fleet of vehicles includes the same graphical representation as the first vehicle.

4. The vehicle system of claim 1, wherein the vehicle is a first vehicle of a fleet of vehicles, and wherein each vehicle of the fleet of vehicles includes a different graphical representation.

5. The vehicle system of claim 1, wherein the mobile device includes a second electronic processor and a second memory, and wherein the second electronic processor is configured to provide a report via the application, the report including at least one selected from a group consisting of a position of the graphical representation, a history of positions of the graphical representation, and a number of impressions of the graphical representation.

6. The vehicle of claim 1, wherein the graphical representation is printed directly on a material that forms the skirt.

7. The vehicle of claim 1, wherein the graphical representation is permanently secured to a material that forms the skirt.

8. The vehicle of claim 1, wherein the graphical representation is printed or otherwise permanently secured to a banner, and wherein the banner is removably secured to a material that forms the skirt.

9. The vehicle of claim 8, wherein the banner includes a first end and a second end opposite the first end, the first end including a first tab and the second end including a second tab, and wherein the first tab is received and removably secured to a first rail supported by the material of the skirt and the second tab is received in and removably secured to a second rail supported by the material of the skirt.

10. A skirt assembly for use with a vehicle configured to transport cargo, the vehicle including a frame, a first set of wheels, and a second set of wheels, the frame having a first end, a second end opposite the first end, a longitudinal axis extending from the first end to the second end, a first side, and a second side opposite the first side, the first set of wheels being positioned rearward of the first end and the second set of wheels being positioned forward of the second end, the skirt assembly comprising:
a first mount secured to the frame between the first set of wheels and the second set of wheels;

a second mount secured to the frame between the first mount and the second end of the frame, the second mount having a tensioning device; and a skirt formed from a pliable material and having a first end and a second end opposite the first end, the first skirt end coupled to the first mount and the second skirt end coupled to the tensioning device;

wherein actuation of the tensioning device tightens the skirt in a direction toward the second end of the frame to a predetermined tension.

11. The skirt assembly of claim 10, further comprising a support mount secured to the frame between the first mount and the second mount, the support mount defining a slot that is oriented parallel to the longitudinal axis, and wherein the skirt includes a coupling element coupled to a surface of the skirt, the coupling element being received in the slot in the support mount.

12. The skirt assembly of claim 10, wherein the second mount is secured between the first mount and the second set of wheels.

13. The skirt assembly of claim 10, wherein the second mount is secured between the second set of wheels and the second end of the frame.

14. The skirt assembly of claim 10, wherein the skirt includes an outwardly facing surface and a graphical representation on an outwardly facing surface.

15. The skirt assembly of claim 10, wherein the skirt is removable from the first mount and the second mount and has a storage configuration.

16. The skirt assembly of claim 10, wherein the first mount includes a first channel oriented perpendicular to the longitudinal axis, the tensioning device is a winch that has a second channel oriented parallel to the first channel, and the skirt has a first coupling element at the first skirt end and a second coupling element at the second skirt end, the first coupling element being received in the first channel and the second coupling element being received in the second channel.

17. A skirt assembly for use with a vehicle configured to transport cargo, the vehicle including a frame, a first set of wheels, and a second set of wheels, the frame having a first end, a second end opposite the first end, a longitudinal axis extending from the first end to the second end, a first side, and a second side opposite the first side, the first set of wheels being positioned rearward of the first end and the second set of wheels being positioned forward of the second end, the skirt assembly comprising:

a first mount secured to the frame between the first set of wheels and the second set of wheels;

a second mount secured to the frame between the first mount and the second end of the frame, the second mount having a first tensioning device and a second tensioning device;

a third mount secured to the frame between the second mount and the second end of the frame;

a first skirt portion being formed of a pliable material and having a first end and a second end opposite the first end, the first end of the first skirt portion coupled to the first mount and the second end of the first skirt portion coupled to the first tensioning device; and a second skirt portion being formed of a pliable material and having a first end and a second end opposite the first end, the first end of the second skirt portion coupled to the second tensioning device and the second end of the first skirt portion coupled to the third mount;

wherein actuation of the first tensioning device tightens the first skirt portion in a direction toward the second end of the frame to a first predetermined tension, and wherein actuation of the second tensioning device tightens the first skirt portion in a direction toward the first end of the frame to a second predetermined tension.

18. The skirt assembly of claim 17, wherein at least a portion of the first skirt portion or the second skirt portion at least partially covers the second set of the wheels.

19. The skirt assembly of claim 17, further comprising a support mount secured to the frame between the first mount and the second mount, the support mount defining a slot that is oriented parallel to the longitudinal axis, and wherein the first skirt portion includes a coupling element coupled to a surface of the first skirt portion, the coupling element being received in the slot in the support mount.

20. The skirt assembly of claim 17, wherein the second mount is secured between the first mount and the second set of wheels.

21. The skirt assembly of claim 17, wherein the second mount is secured between the second set of wheels and the second end of the frame.

22. The skirt assembly of claim 17, wherein the first skirt portion, the second skirt portion or both include an outwardly facing surface and a graphical representation on the outwardly facing surface.

23. The skirt assembly of claim 17, wherein the skirt is removable from the first mount and the second mount and has a storage configuration.

24. The skirt assembly of claim 17, wherein the first mount includes a first channel oriented perpendicular to the longitudinal axis, the first tensioning device is a first winch that has a second channel oriented parallel to the first channel, the second tensioning device is a second winch that has a third channel oriented parallel to the first channel, the third mount includes a fourth channel oriented parallel to the first channel, the first skirt portion has a first coupling element at the first end thereof and a second coupling element at the second end thereof, the first coupling element of the first skirt portion being received in the first channel and the second coupling element of the first skirt portion being received in the second channel, and the second skirt portion has a first coupling element at the first end thereof and a second coupling element at the second end thereof, the first coupling element of the second skirt portion being received in the third channel and the second coupling element of the second skirt portion being received in the fourth channel.

* * * * *